US012118599B2

(12) United States Patent
Moghadam et al.

(10) Patent No.: US 12,118,599 B2
(45) Date of Patent: Oct. 15, 2024

(54) SYSTEMS AND METHODS FOR DYNAMIC PRICING OF FOOD ITEMS

(71) Applicants: Abdolreza Abdolhosseini Moghadam, San Jose, CA (US); Sara Sohrabi, San Jose, CA (US)

(72) Inventors: Abdolreza Abdolhosseini Moghadam, San Jose, CA (US); Sara Sohrabi, San Jose, CA (US)

(*) Notice: Subject to any disclaimer, the term of this patent is extended or adjusted under 35 U.S.C. 154(b) by 0 days.

(21) Appl. No.: 17/248,170

(22) Filed: Jan. 12, 2021

(65) Prior Publication Data

US 2021/0241338 A1   Aug. 5, 2021

Related U.S. Application Data

(62) Division of application No. 15/747,556, filed as application No. PCT/US2016/056136 on Oct. 7, 2016, now Pat. No. 10,902,494.

(Continued)

(51) Int. Cl.
*G06Q 30/06* (2023.01)
*G06Q 30/0283* (2023.01)
(Continued)

(52) U.S. Cl.
CPC ..... *G06Q 30/0621* (2013.01); *G06Q 30/0283* (2013.01); *G06Q 30/0643* (2013.01); *G06Q 30/02* (2013.01); *G06Q 50/12* (2013.01)

(58) Field of Classification Search
CPC ........... G06Q 30/0621; G06Q 30/0643; G06Q 30/0283
(Continued)

(56) References Cited

U.S. PATENT DOCUMENTS 10,902,494 B2    1/2021  Moghadam et al.
2003/0026836 A1*  2/2003  Darbyshire ............. A23G 3/52
                                                424/465
(Continued)

FOREIGN PATENT DOCUMENTS

CN   102054117 A  *  5/2011  ............. G06F 19/00
CN   104303185 A  *  1/2015  ............ A61B 5/4866
WO   WO 2011/124928 A1   10/2011

OTHER PUBLICATIONS

Article, "Toshiba Tec Seeks Patent for Reservation Management Device, Restaurant System and Reservation Management Program"; Publication info: Global IP News. Business and Commerce Patent News [New Delhi] Sep. 26, 2015; retrieved from Dialog database on Aug. 19, 2022 (Year: 2015).*

(Continued)

*Primary Examiner* — Yogesh C Garg
(74) *Attorney, Agent, or Firm* — Knobbe, Martens, Olson & Bear, LLP

(57) ABSTRACT

A system and method for dynamic pricing of food items that are configured to apply one or more algorithms to prepare adjustments in the food item ingredient composition (e.g., the recipe of a food item) to accommodate a desired price, caloric content, dietary restriction requirement, and/or nutritional value. The system will process the customer-user's inputs of a modification of the ingredients for the food item. System processes for recipe modifications can be made in real-time, and may be locally processed or remotely processed, e.g., via access to a network server. Optionally, some or all of the system processes for recipe modifications may be preprocessed and stored in a system-accessible database. In some embodiments, a custom designed secure hardware component is deployed in the system in order to protect (Continued)

confidential pricing data, and gives a tool for managing the dynamic sales for a food retail establishment.

21 Claims, 17 Drawing Sheets

Related U.S. Application Data

(60) Provisional application No. 62/238,520, filed on Oct. 7, 2015.

(51) Int. Cl.
*G06Q 30/0601* (2023.01)
*G06Q 30/02* (2023.01)
*G06Q 50/12* (2012.01)

(58) Field of Classification Search
USPC ........................................................ 705/27.2
See application file for complete search history.

(56) References Cited

U.S. PATENT DOCUMENTS

| | | | |
|---|---|---|---|
| 2003/0171944 A1 | 9/2003 | Fine et al. | |
| 2003/0208409 A1 | 11/2003 | Mault | |
| 2003/0225731 A1* | 12/2003 | Vidgen | G16H 20/60 |
| 2006/0122468 A1* | 6/2006 | Tavor | G16H 20/60 |
| | | | 600/300 |
| 2007/0038727 A1 | 2/2007 | Bailey et al. | |
| 2008/0086374 A1* | 4/2008 | Aitken | G06Q 30/02 |
| | | | 705/14.27 |
| 2009/0259553 A1 | 10/2009 | Carroll et al. | |
| 2010/0070374 A1 | 3/2010 | Carter | |
| 2010/0106607 A1 | 4/2010 | Riddiford et al. | |
| 2012/0233002 A1 | 9/2012 | Abujbara | |
| 2013/0130208 A1 | 5/2013 | Riscalla | |
| 2013/0151357 A1 | 6/2013 | Havas et al. | |
| 2013/0216982 A1* | 8/2013 | Bennett | A61B 5/4866 |
| | | | 434/127 |
| 2013/0339163 A1 | 12/2013 | Dumontet et al. | |
| 2014/0072935 A1 | 3/2014 | Herron et al. | |
| 2014/0324607 A1* | 10/2014 | Frehn | G06Q 50/12 |
| | | | 705/15 |
| 2015/0120482 A1 | 4/2015 | Kourpas et al. | |
| 2015/0348210 A1* | 12/2015 | Inagawa | G06Q 40/12 |
| | | | 705/30 |
| 2018/0218414 A1 | 8/2018 | Moghadam et al. | |

OTHER PUBLICATIONS

Rowe, Megan; "Edgy Hotel Restaurants", published in Restaurant Hospitality 95.3: NA. Penton Media, Inc., Penton Business Media, Inc. and their subsidiaries. (Mar. 1, 2011), retrieved on Apr. 5, 2023 . (Year: 2011).*
Office Action Issued for Australian Application No. 2016335867 dated Jul. 9, 2021 in 7 pages.
Office Action Issued for India Application No. 201817012086 dated Oct. 4, 2021 in 9 pages.
Office Action Issued for Australian Application No. 2016335867 dated Jun. 10, 2022 in 4 pages.
Summons to Attend Oral Proceedings Pursuant to Rule 115(1) EPC Issued for International Application No. 16854495.5 dated Jun. 29, 2022 in 13 pages.
Office Action Issued for Australian Application No. 2016335867 dated Mar. 1, 2022 in 4 pages.
Office Action Issued for European Application No. 16854495.5 dated Feb. 10, 2021 in 8 pages.
Derwent Account: 2016-30079T, May 1, 2016, Babu et al.
Anonymous, "Trabon Bolsters Menu Net"; published in Entertainment Close—Up [Jacksonville] May 6, 2011; extracted from Google database on Sep. 14, 2020.
Extended European Search Report for International Application No. 16854495.5 dated Apr. 1, 2019.
International Search Report and Written Opinion Issued for International Application No. PCT/US2016/056136 dated Jan. 12, 2017.

* cited by examiner

FIG. 1

CALCULATOR POS NO OPTION

CUSTOMER OPTION A SELECTION NO CHANGE TO MENU ITEM -- PSEUDO CODE

CUSTOMER SELECTS MENU ITEM

MTX. A ELEM. A11 -- HAMBURGER

MTX. B ELEMENT B11 COST = $1.50

CUST. ENTERS HOW MANY OF MENU ITEM -- PROG. USES MATRIX C AS ENTRY ELEM. (IN THIS CASE = 1 HAMBURGER -- ELEM. C11 = 1)

GENERATE PRICE = C11*Σ[(B11*(30%)) + (B11*TAX(7%)) + (B11)]

NUMBER OF MENU ITEMS(C11)*Σ(COST(B11)*PROFIT(%)) + (COST(B11)*TAX(%)) + (COST(B11))

PRICE = $1.50*30% + $1.50*(7%) + $1.50 = $2.06 OR $2.10 RND. OFF

HAMBURGER INGREDIENT MATRIX D (D11-D110) AND INGREDIENT COST MATRIX N (N11-N110)

COST OF ING. = MTX. N ELEM. = Σ(N11:N110) = $1.50

CALOR. MTX. CAL 10 ROWS 1X10 CORR. TO THE ING. MTX. D/W

VITAMIN MTX. VIT 10 ROWS 1X10 CORR. TO THE ING. MTX. D/W

GENERATE CUSTOMER TICKET POINT OF SALE (POS)

PRINT ORDER, CONTENTS, AND PRICE

RETURN FOR NEXT ORDER

| MTX. D | MTX. N |
|---|---|
| D11 - BUN | N11 - $0.25 |
| D12 - MEAT | N12 - $0.25 |
| D13 - CHEESE | N13 - $0.25 |
| D14 - CATSUP | N14 - $0.10 |
| D15 - MAYO | N15 - $0.10 |
| D16 - TOMATO | N16 - $0.10 |
| D17 - PICKLE | N17 - $0.10 |
| D18 - MUSTARD | N18 - $0.10 |
| D19 - ONION | N19 - $0.10 |
| D110 - LETTUCE | N110 - $0.10 |
| TOTAL | $1.50 |

FIG. 9

| CUSTOMER OPTION D SELECTION OF NEGOTIATE PRICE OF MENU ITEM PSEUDO CODE | |
|---|---|
| NEGOTIATE PRICE OPTION SELECTED BY CUST. | MENU ITEM SELECTED |
| NUMBER OF SAME ITEM SELECTED | MATRIX A A11 HAMBURGER SELECTED |

1500

1501  MATRIX B B11 COST $1.50 – PRICE IS CALCULATED AND STORED IN DB

IF CUST. CHANGE IS DESIRED TO REDUCE PRICE TO ENTERED AMOUNT
THEN, DISPLAY MENU ITEM INGREDIENTS WITH SUBTRACTED INGREDIENT
IF CUST. CHANGE IS DESIRED TO INCREASE PRICE TO ENTERED AMOUNT
THEN, DISPLAY MENU ITEM INGREDIENTS WITH ADDED INGREDIENT

1502  IF CUST. PRICE ENTERED IS TOO HIGH OR TOO LOW, PROG. RETURNS TO START AGAIN
GENERATE LIST OF MENU ITEM INGREDIENTS BEFORE AND AFTER CHANGE
MATRIX D (V11:VT110) = A = LIST FOR HAMBURGER INGREDIENTS
A – (SUBT./ADDED INGREDIENT) = NEW INGREDIENT LIST OF MENU ITEM SELECTED
USE MATRIX N TO CALCULATE THE NEW COST AS FOLLOWS:

1503  MATRIX N ∑(M11:N110) – ∑(SUBT./ADDED INGREDIENT) = NEW COST = NC RECORD NC IN DB
GENERATE NEW PRICE = C11{(NC*PROFIT(%)) + (NC*TAX) + NC}

TICKET IS GENERATED WITH NEW PRICE AND STORED IN DB
IF APPROVED BY CUST., TICKET IS GENERATED WITH NEW PRICE AND STORED IN DB

1504  IF NOT APPROVED BY CUST., PROG. RESPONDS BY ASKING CUST. TO ALLOW ANOTHER ING. REMOVED AND CUST. DOES NOT APPROVE, ING. CHOICE
IF ALL NON RESTRICTED ING. ARE ADDED/REMOVED AND CUST. DOES NOT APPROVE, THEN NEGOTIATION HAS FAILED AND PROG. RETURNS TO START AGAIN RETURN

FIG. 15

CUSTOMER OPTION E SELECTION - SYSTEM TO DETERMINE MENU ITEM FOR CUSTOMER - PSEUDO CODE

1700 — CUSTOMER ENTERS DESIRED NUTRIENT/CALORIE/PRICE OR ALL

CUSTOMER OPTIONS TO LET THE SYSTEM DETERMINE AND SELECT A MENU ITEM

PROGRAM MATRIX ELEMENTS ARE SCANNED TO BEST FIT FOR CUSTOMER ENTRIES

NUTRIENT MATCH UP IS DETERMINED BY COMPARISON OF NUTRIENT MATRIX ELEMENTS TO ENTRY INPUTS

CAL. MATCH UP IS DETER. BY COMPARISON OF MTX. CAL ELEM. TO ENTRY INPUTS

PRICE MATCH UP IS DETER. BY COMPARISON OF MTX. PR ELEM. TO ENTRY INPUTS

1701 — MENU ITEM IS DETERMINED FROM MTX. ELEM. MATCH UP WITH MTX. A MENU ITEM

MULTIPLE MENU ITEMS MAY BE DISPLAYED TO CUSTOMER DUE TO MATCH UP

1702 — ITEM(S) DETERMINED IS/ARE DISPLAYED ON CUSTOMER DISPLAY TERMINAL

CUSTOMER APPROVES DETERMINED MENU ITEM

IF CUSTOMER REJECTS DETERMINED MENU ITEM, THEN, ITERATIVE ENTRIES ARE MADE BY CUSTOMER TO GET A DESIRED MENU ITEM

1703 — IF NO SATISFACTION SELECTION FAILS AND PROGRAM RETURNS TO ENTRY

1704 — IF SATISFIED, THEN, CUSTOMER ENTERS HOW MANY (NUMBER MATRIX C); PRICE IS GENERATED AND STORED ON DB

CUSTOMER TICKET S GENERATED AND STORED ON DB

RETURN

FIG. 17

SYSTEMS AND METHODS FOR DYNAMIC PRICING OF FOOD ITEMS

CROSS-REFERENCE TO RELATED APPLICATIONS

This application claims priority to, and is a divisional of, U.S. patent application Ser. No. 15/747,556 titled 'SYSTEMS AND METHODS FOR DYNAMIC PRICING OF FOOD ITEMS' and filed on Jan. 25, 2018. U.S. patent application Ser. No. 15/747,556 is a U.S. national phase application of International Application No. PCT/US2016/056136, filed Oct. 7, 2016, which claims priority to U.S. Provisional Application No. 62/238,520 to Abdolreza Abdolhosseini Moghadam and Sara Sohrabi filed on Oct. 7, 2015. Each of the above-identified applications are incorporated herein by reference in their entireties.

FIELD OF THE INVENTION

The disclosed embodiments relate generally to the food service industry, and in particular to systems and methods for adjusting ingredient composition of all or some food items in a retail setting to satisfy the nutritional, caloric, and price requirements of a customer.

BACKGROUND OF THE INVENTION

Unless otherwise indicated herein, the approaches described in this section are not prior art to the claims of this invention, and are not admitted to be prior art by inclusion herein.

Food is one of the fundamental needs of human beings. Middle and lower income classes of consumers constitute the majority of the population, domestically and abroad, and a fair portion of the income of the members of these social classes is spent on food. While some ingredients may be selected or withheld by customer choice, there is presently little or no control given to a consumer over the overall pricing, full recipe ingredient composition, total caloric content, and/or nutritional value of food items selected from a prepared menu (menu items). Most control is given in simply choosing a different menu item. For instance, consider a chain retail restaurant that offers a roast-beef sandwich with some flexibility in the sandwich size (and hence prices); however, the chain retail restaurant only provides foot-long and 6-inch sandwiches with prices of $8 and $5, respectively. If a customer is only willing to spend $4 on a sandwich, short of a manager willing to enter into negotiations for the price of a modified sandwich, there are practically no options for that customer except to choose something else from the prepared menu. As another example of the prior art, there may be certain nutritional properties that are preferred by a customer, such as amount of intake for total calories, total fat, cholesterol, and so on. Even fewer options are available to control for caloric intake or nutritional value of menu items.

Thus, there is a need for an ability to give customers more control over how much they spend in a retail food establishment rather than a single option of prepared menus dictating the price of the food by the food industry owners. Consequently, it would be desirable to have a customer option of controlling food pricing, ingredient composition and/or the amount of each ingredient, and the caloric and nutritional content of food items (including managing the intake of beneficial and potentially harmful/unhealthy ingredients that are to be consumed by the customer).

SUMMARY OF THE INVENTION

It is an object of this invention to satisfy the need for customer-user food options as systems and methods that allow a customer-user to customize a food order from a menu item list by modifying the ingredient components as desired by one or more factors (e.g., pricing, caloric content, nutritional value, etc.) and pay accordingly to the content modification of ingredients and/or constrained by a predetermined price set by the customer-user. It is another object of the invention to allow for a non-menu item to be generated using the system and methods of the present invention as created or requested by a user by inputting requested ingredients with or without other item limitations or bounds (e.g., calorie, price, etc.), thus creating a new recipe for a food item to order. The present invention provides a dynamic pricing method and a process of algorithms to accomplish these objects.

In one aspect, the present invention provides A system for dynamic pricing of menu items comprising a computing device, the computing device being a hardware component of the system; at least one user terminal in communication with the computing device; at least one memory element in communication with the computing device, the at least one memory element storing a plurality of sets of data entries and a plurality of instructions that when executed by the computing device execute the steps of providing a user interface application displayed on the at least one user terminal, the user interface application providing a customer-user with at least an option to order a selected food menu item and an option to modify the selected food menu item before purchase; in response to receiving a first customer-user selection, via an electronic input at the at least one user terminal, of the option to order a food menu item, searching the at least one memory element wherein said at least one memory element stores a first set of data entries for a plurality of food menu items available for order, displaying the selected food menu item and associated food menu item base information comprising at least an associated food menu item base price, and displaying the further option to modify the selected food menu item before purchase; in response to receiving a second customer-user selection, via an electronic input at the at least one user terminal, of the option to modify the selected food menu item before purchase, searching the at least one memory element wherein said at least one memory element stores a second set of data entries for the plurality of food menu items available for order, wherein the second set of data entries corresponds to the first set of data entries and comprises at least recipe data for the food menu items available for order, displaying an option to modify at least one recipe ingredient component of the selected food menu item.

In some embodiments, the option to modify at least one recipe ingredient component of the selected food menu item comprises the steps in response to receiving a customer-user selection, via an electronic input at the at least one user terminal, of a modification of the price of the selected food menu item, searching a third set of data entries that corresponds to the second set of data entries and comprises ingredient pricing costs for each ingredient of the recipe data for the selected food menu item, processing a change in one or more ingredients of the selected food menu item to meet the received price modification, processing a change in the price of the modified food menu item corresponding to the ingredient change, and displaying the ingredient change and the price change of the selected food menu item to the customer-user. In some embodiments, the option to modify at least one recipe ingredient component of the selected food menu item further comprises the steps in response to receiving a customer-user selection, via an electronic input at the at least one user terminal, of a modification of the price of the selected food menu item, searching a fourth set of data entries that corresponds to the third set of data entries and comprises ingredient profit limits for each ingredient of the recipe data for the selected food menu item, processing a feasibility of the modified price, and displaying a message to the customer-user rejecting the received modified price if not feasible or displaying a message to the customer-user accepting the received modified price if feasible. In other embodiments, the option to modify at least one recipe ingredient component of the selected food menu item comprises the steps in response to receiving a customer-user selection, via an electronic input at the at least one user terminal, of a modification of the caloric content of the selected food menu item, searching a third set of data entries that corresponds to the second set of data entries and comprises ingredient caloric content for each ingredient of the recipe data for the selected food menu item, processing a change in one or more ingredients of the selected food menu item to meet the received caloric content modification, processing a change in the price of the modified food menu item corresponding to the ingredient change, and displaying the ingredient change and the price change of the selected food menu item to the customer-user. Caloric content modifications may comprise a change in a saturated fat content, an unsaturated fat content, a total fat content, a sugars content, a carbohydrate content, a protein content, or combinations thereof.

In some embodiments, the option to modify at least one recipe ingredient component of the selected food menu item comprises the steps in response to receiving a customer-user selection, via an electronic input at the at least one user terminal, of a modification of the nutritional content of the selected food menu item, searching a third set of data entries that corresponds to the second set of data entries and comprises ingredient nutritional content for each ingredient of the recipe data for the selected food menu item, processing a change in one or more ingredients of the selected food menu item to meet the received nutritional content modification, processing a change in the price of the modified food menu item corresponding to the ingredient change, and displaying the ingredient change and the price change of the selected food menu item to the customer-user. The modification of the nutritional content may comprise a change in a saturated fat content, an unsaturated fat content, a total fat content, a sugars content, a carbohydrate content, a protein content, a total calorie content, a water content, a vitamin content, a mineral content, a salt content, a caffeine content, a preservative content, a food dye content, a non-nutritive food additive content, or combinations thereof.

In some preferred embodiments, the first set of data entries and second set of data entries are stored as a data matrices. Some preferred embodiments further comprise the steps in response to receiving a customer-user selection, via an electronic input at the at least one user terminal, of an acceptance of the displayed ingredient change and the price change, generating an order ticket price receipt and saving the order in a database. The computing device may comprise a central processing unit, a microprocessor, a DSP, a GPU, a distributed processing system, a general purpose processor, a FPGA, or a combination thereof. In some embodiments, the computing device comprises a custom programmed FPGA pricing calculator with an integral non-volatile memory element containing food menu item recipe and pricing data. The at least one memory element is at least two memory elements comprising a nonvolatile memory element that includes a database storage unit and a volatile cache memory element. In some preferred embodiments, the computing device is remote relative to the user terminal, and/or the system further comprises a remote server in communication with the computing device. In some embodiments, the system may further comprise a web application software component accessible by the customer-user. In some preferred embodiments, the user terminal may be selected from the group consisting of a smartphone, a laptop, a tablet, a desktop computer, and a web app terminal. In some preferred embodiments, the system further comprises an administration software component stored in the at least one memory element.

In some embodiments, the option to modify the selected food menu item before purchase is limited to a predetermined database of acceptable modified food menu items. In some preferred embodiments, the option to modify at least one recipe ingredient component of the selected food menu item comprises an option selected from the group consisting of an option to modify the price of the selected food menu item, an option to modify the caloric content of the selected food menu item, an option to modify the nutritional content of the selected food menu item, and combinations thereof. In some preferred embodiments, the computing device is a CPU and a custom pricing calculator, the at least one memory element is at least two memory elements comprising a non-volatile database storage unit and a volatile cache, and further comprising a network connection, and wherein the non-volatile database storage unit includes a matrix architecture storing data entries in a series of layered matrices corresponding to a data set comprising a food menu item listing.

In some preferred embodiments, the option to modify at least one recipe ingredient component of the selected food menu item comprises the steps in response to receiving a customer-user selection, via an electronic input at the at least one user terminal, of at least one food menu item characteristic bounds selected from the group consisting of a nutritional content, a caloric content, a pricing, and combination thereof; searching the plurality of sets of data entries; and displaying a retrieved food menu item matching the received at least one food menu item characteristic bounds. In more preferred embodiments, the system further comprises the step of processing a change in one or more ingredients of the retrieved food menu item to meet the received at least one food menu item characteristic bounds; processing a change in the price of the retrieved food menu item corresponding to the ingredient change, and displaying the ingredient change and the price change of the retrieved food menu item to the customer-user. In still more preferred embodiments, the step of processing a change in one or more ingredients of the retrieved food menu item to meet the received at least one food menu item characteristic bounds includes solving an optimization equation (Formula I):

$$\hat{x} = \mathrm{argmax}\ g(x, L)$$

subject to:

$$\forall i \in S: x_i = 0$$

$$\forall i \in S,\ 1 \le x_i \le M_i,$$

$x \in H_L \cap H_x$ $T + f_c(x, C) \leq \overline{\text{Cost}}$.

In another aspect, the present invention provides a method for dynamic pricing of menu items comprising: providing a computer readable memory element comprising a plurality of data sets, wherein a first data set contains data entries for a plurality of food menu items populating a food menu item listing; receiving a first input from a customer-user selection of a food menu item from the food menu item listing; searching the first data set in the plurality of data sets for data entries associated with the selected food menu item; displaying stored food menu item data entries for the selected food menu item and an option for a modification of the selected food menu item; receiving a second input from the customer-user selection of a request to modify the selected food menu item; searching a second data set in the plurality of data sets for data entries associated with the selected food menu item, wherein the second data set contains recipe data corresponding to the first data set data entries; and displaying at least one recipe data stored food menu item information for the selected food menu item and an option for a modification of a recipe ingredient of the selected food menu item.

In some embodiments, the option for a modification of a recipe ingredient of the selected food menu item is selected from the group consisting of an option for a modification of a calorie content of the selected food menu item, an option for a modification of a nutritional content of the selected food menu item, an option for a modification of a price of the selected food menu item, and combinations thereof. In some embodiments, the option for a modification of a recipe ingredient of the selected food menu item is an option for a modification of a calorie content of the selected food menu item and wherein the modification of the calorie content comprises a change in a saturated fat content, an unsaturated fat content, a total fat content, a sugars content, a carbohydrate content, a protein content, or combinations thereof. In preferred embodiments, the method further comprises an option for a modification of a price of the selected food menu item.

In some embodiments, the option for a modification of a recipe ingredient of the selected food menu item is an option for a modification of a nutritional content of the selected food menu item and wherein the modification of the nutritional content comprises a change in a saturated fat content, an unsaturated fat content, a total fat content, a sugars content, a carbohydrate content, a protein content, a total calorie content, a water content, a vitamin content, a mineral content, a salt content, a caffeine content, a preservative content, a food dye content, a non-nutritive food additive content, or combinations thereof. In preferred embodiments, the method further comprises an option for a modification of a price of the selected food menu item. In more preferred embodiments, the option for a modification of a recipe ingredient of the selected food menu item is an option for a modification of a price of the selected food menu item.

In a further aspect, the present invention provides a method for dynamic pricing of menu items comprising: providing a computer readable memory element comprising a plurality of data sets, wherein a first data set contains data entries for a plurality of food menu items populating a food menu item listing; receiving a first input from a customer-user selection of a food menu item from the food menu item listing; searching the first data set in the plurality of data sets for data entries associated with the selected food menu item; displaying stored food menu item data entries for the selected food menu item and an option for a modification of the selected food menu item; receiving a second input from the customer-user selection of a request to modify the selected food menu item; searching a second data set in the plurality of data sets for data entries associated with the selected food menu item, wherein the second data set contains cost data corresponding to the first data set data entries; and displaying at least one recipe data stored food menu item information for the selected food menu item and an option for a modification of a price of the selected food menu item.

In yet another aspect, the present invention provides a method for dynamic pricing of menu items comprising: providing a computer readable memory element comprising a plurality of data sets, wherein a first data set contains data entries for a plurality of food menu items populating a food menu item listing, a second data set contains data entries for a recipe comprising one or more individual ingredients corresponding to each of the plurality of food menu items populating a food menu item listing, and a third data set contains data entries for ingredient costs corresponding to each of the plurality of food menu items populating a food menu item listing; displaying an option to select a food menu item of the food menu item listing and an option to select a food menu item characteristic bounds selected from the group consisting of a nutritional content, a caloric content, a pricing, and combination thereof; receiving a first input from a customer-user selection of the option to select a food menu item characteristic bounds; processing the first input comprising the food menu item characteristic bounds; searching the plurality of data sets for data entries matching the food menu item characteristic bounds; and displaying at least one option including an option to select a retrieved food menu item matching the food menu item characteristic bounds.

In some embodiments, the at least one option is at least two options further comprising an option to revise the food menu item characteristic bounds. In still other embodiments, the characteristic bounds is a nutritional content. In other embodiments, the characteristic bounds is a caloric content. In further embodiments, the characteristic bounds is a pricing.

In some embodiments, the method further comprises modifying a recipe in the second data set to generate a modified food menu item matching the food menu item characteristic bounds. In some preferred embodiments, the step of processing the first input comprising the food menu item characteristic bounds includes solving an optimization equation (Formula I):

$\hat{x} = \text{argmax } g(x, L)$ subject to:

$\forall i \in S: x_i = 0$ $\forall i \in S, 1 \leq x_i \leq M_i,$ $x \in H_L \cap H_x$ $T + f_c(x, C) \leq \overline{\text{Cost}}$.

where $\hat{x}$ is the solution, S is a set of ingredients requested by customer, g is a desirability function, $M_i$ is a max count bound on the $i^{th}$ ingredient, $H_L$ and $H_L$ are an induced spaces by constraints on ingredients and requested nutrients, T is a tax, $f_c$ is cost function including profit, and Cost is the amount the customer is willing to pay.

BRIEF DESCRIPTION OF THE DRAWINGS

Further advantages of the invention will become apparent by reference to the detailed description of preferred embodiments when considered in conjunction with the drawings which form a portion of the disclosure and wherein:

FIG. 1 is a schematic block diagram of a dynamic pricing software for Menu Item Matrix A. Matrix A is the driver architecture for this invention, according to some embodiments.

FIG. 3 is a schematic block diagram, of a Point Of Sale (POS) system and dynamic pricing architecture for the food service industry, in accordance with an example embodiment herein this document.

FIG. 9 is a schematic block diagram of prose Pseudo Code to describe the software dynamic pricing process of customer-user selected Option A, according to some embodiments.

FIG. 15 is a schematic block diagram of prose Pseudo Code to describe the software dynamic pricing process of customer-user selected option D, according to some embodiments.

FIG. 16 is a block diagram of the pricing Matrix PR.

FIG. 17 is a schematic block diagram of prose Pseudo Code to describe the software dynamic pricing process of customer-user selected option E, according to some embodiments.

DETAILED DESCRIPTION

Figure 2:
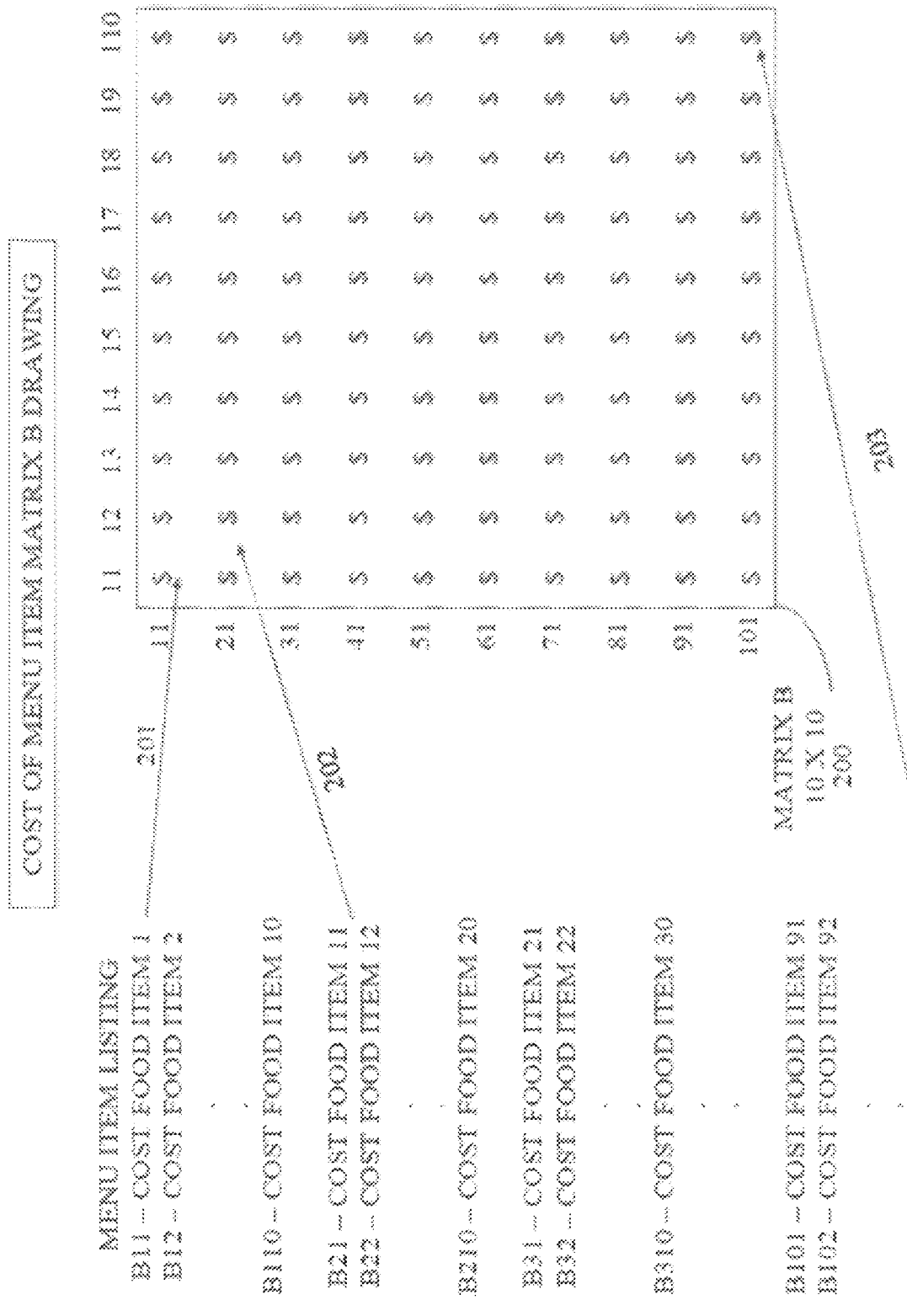
FIG. 2 is a schematic block diagram of a dynamic pricing software for Cost of Menu Item Matrix B. Matrix B is the food item cost driver architecture for this invention, according to some embodiments.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Described herein are the invention methods and processes for a customer-user, to option on for a seller of food items, where the customer-user desires to adjust the portion size and/or composition of food items, or to accommodate the customer-user desired purchase expense and/or nutrient (minerals, carbohydrates, fat, minerals, water and proteins) intake. In the following description, for purposes of explanation, numerous examples and specific details are set forth in order to provide a thorough understanding of the aspects of the invention systems and methods. It should be understood that the disclosed systems and methods are not restricted to fast food chain restaurants and can be extended to other types of restaurants or food related services, such as ice-cream shops, ethnic restaurants, food caterers, bakeries, and so on.

Described herein are systems, processes, and methods providing dynamic pricing in the food service industry, including customer-user modification of the ingredients (i.e., contents/composition), caloric and nutritional contents, and/or price of all or some food menu items to meet demand of an individual customer-user. In some embodiments, a system is configured to apply one or more algorithms to process modifications of a composition of a food menu item (e.g., the recipe of a sandwich, including amount of each ingredient, such as bread, meat, cheese, vegetables, and condiments) to accommodate the desired price, caloric content, and/or nutritional intake of the customer-user.

In some embodiments, a dynamic pricing process is set up for a retail food establishment where a customer-user has full control to set parameters of a food menu item, such as a price (optionally, within certain predetermined limits), amount of and/or type of ingredients, and the caloric and micro & macro nutritional contents (e.g. vitamin, protein, water, mineral, carbohydrates and fat). In preferred embodiments, the set parameters are fulfilled within a small margin of error.

In some embodiments, the dynamic pricing process and recipe modifications are made in real time, e.g., by a special purpose computer software system which (in some preferred embodiments) includes a custom computing device, such as a Field Programmable Gate Array (FPGA), a microcontroller, a general purpose processor, a processor, a microprocessor, a Digital Signal Processor (DSP), a Graphics Processing Unit (GPU), or (in other preferred embodiments) includes a remote access to a system server over a network; one or more computing dynamic pricing algorithms; a system database (local or remote) storing food cost data, nutritional data, and menu item information; and a user interface (i.e., user terminal). In some embodiments, the user interface may include a remote and/or mobile device, such as a mobile smartphone, tablet, or laptop computer, having user screen display fields or other features for customer-user input, choice, or otherwise selection of desired price, size, caloric content, and/or nutritional content of a food menu item, and for displaying a corresponding recipe. The customer-user input may be achieved by typing, clicking, electronic/virtual buttons, voice command, selecting pre-determined (provided) choices, or otherwise providing an electronic input of information to the system. In some embodiments, food menu item modifications inputs are received by the system, processed by the system, and a corresponding price is prepared and displayed by the system onto the user interface.

From the data-base data entered by customer-user, the system can respond to a customer-user food item nutrient inquiry and provide a nutrient intake listing of food item ingredient specification. This data information can aid a customer-user that desires to see what nutrients are lacking or are excessive m a continuous run of food item ordering and data collection.

In some embodiments, configuration adjustments and/or pricing, may be made m real time, e.g., using a point of sale system or online server-based system. In other embodiments, menu adjustments may be pre-processed and provided, for example, on a lookup table, cache or spreadsheet.

In some embodiments, a "light" version of a menu item may be ordered, e.g., a lower priced and/or healthier version, wherein the recipe or composition of the item and corresponding price are adjusted. In some embodiments, one or more "tiers" or versions may be pre-defined or pre-processed to provide desired recipes and corresponding prices, e.g., to adjust size of a food item (e.g., sandwich, ice-cream), the amount of food items (meat, vegetables, condiments, ice-cream type) or overall nutritional contents. In some embodiments, the composition of the food item may be dynamically calculated and adjusted in response to a price the customer-user is willing to pay and meet the intake nutritional properties desired by the customer-user. In some embodiments, other alternative menu items are pre-programmed or predefined, including alternative pricing and recipes/composition.

These as well as other aspects and advantages will become apparent to those of ordinary skill in the art, by reading the following detailed description with reference where appropriate to the accompanying drawings. Furthermore, it should be understood that the embodiments described in this overview and elsewhere are intended to be examples only and do not necessarily limit the scope of this invention.

Figure 1:
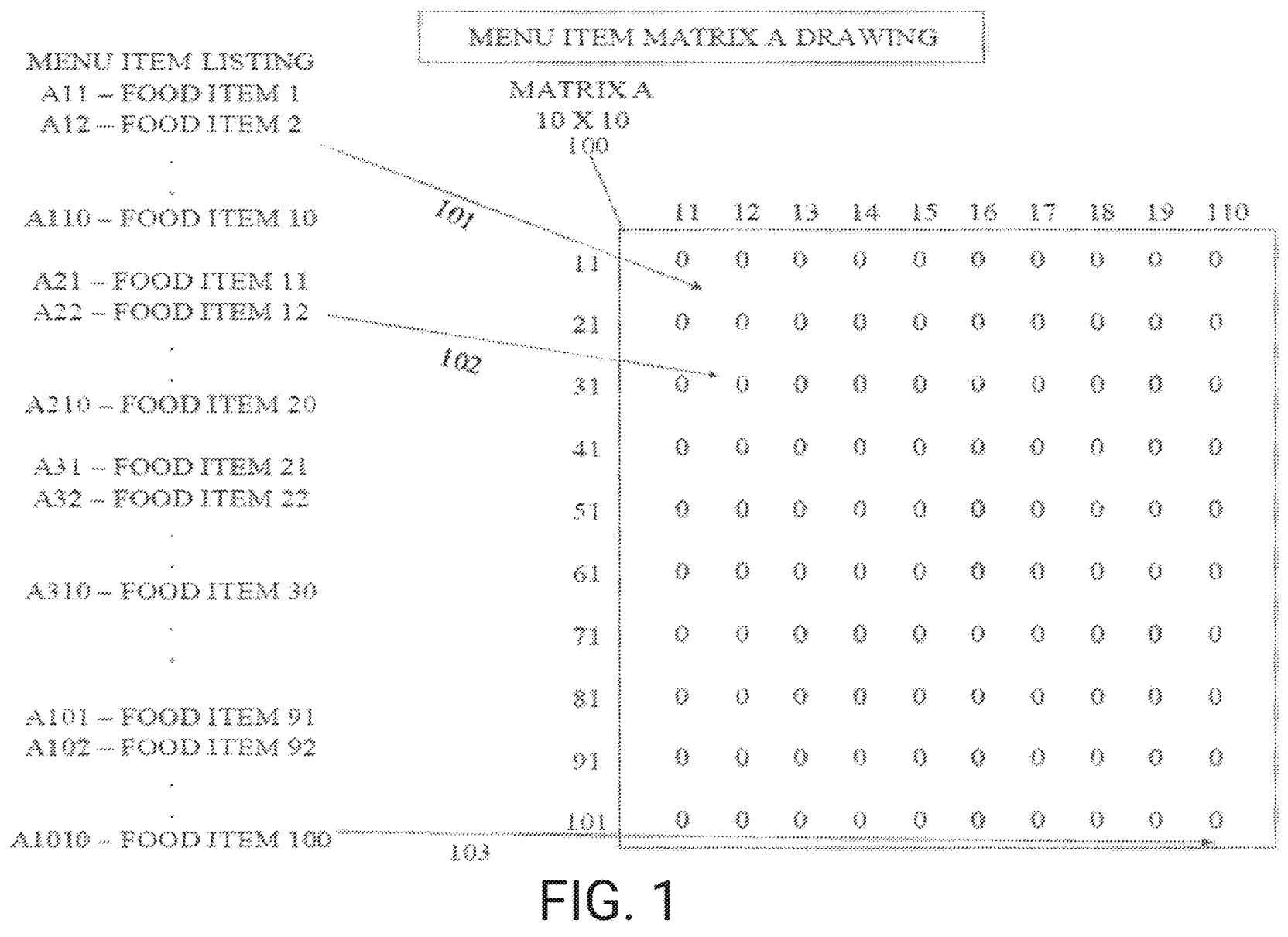

Now referring to FIG. 1, an exemplary schematic block diagram of a dynamic pricing matrix design embodiment is shown for a food menu item listing mapped into a 10×10 Matrix A 100 allowing for one hundred food item choices offered for sale by a food service (e.g., restaurant). The elements of Matrix A 100 are assigned to the different food menu items (e.g., 101, 102, 103, etc.) as desired or input by a user; however, in embodiments using the matrix architecture, the matrix element assignments shall coordinate and dictate the system architecture mapping of additional matrix element assignments throughout the software and hardware design of this embodiment of the present invention, such as number of item nutrients (vitamins, carbohydrates, fat, minerals, water, protein, etc.) ingredients, ingredient content of calories, cost of each ingredient, composition of item cost, and total price of the final composed Menu Item as approved/requested by the customer-user. For instance, elements 101, 102, etc. may be input and assigned to food menu items such as hamburger, hotdog, taco, fish, sandwich, etc. as examples only without limitation. A food menu item 103 (Food Item 100 at A1010) may then be selected by a customer-user from a display panel 303, then the system program matches the cost of the selected food menu item 103 with the cost data stored in Matrix B 200 (see FIG. 2). As one example, the number of food menu items selected within Matrix A 100 will generate the processed price from the formula $P = N \times A_{n,m} \times B_{n,m}$ to produce a direct point of sale process (n=matrix row and m=matrix column).

Now referring to FIG. 2, an exemplary schematic block diagram of a dynamic pricing matrix design embodiment is shown for a food menu item listing material cost mapped into a Matrix B 200, for one hundred food item choices offered for sale that correspond to the food menus items listed in Matrix A 100 (see FIG. 1). The food menu item cost data elements (201, 202, 203, etc.) of Matrix B 200 are assigned and correspond to the food menu items of Matrix A 100 (101, 102, 103, etc.) in lock-step to form a one (103) to one (203) element relationship for the later dynamic price processing method; however, in embodiments using the matrix architecture, the Matrix B 200 element assignments shall coordinate and dictate the system architecture mapping of additional Matrix element assignments throughout the software and hardware design of this invention. For instance, a food menu item 103 from Matrix A 100 (see FIG. 1) may be selected by a customer-user from a display panel 303, then the system program matches the cost element 203 (Food Item 100 at A1010) of the selected food menu item 103 (Cost Food Item 100 at B1010) input and stored in the cost data Matrix B 200. The components shown in FIG. 2 are not intended to limit the scope of the invention, nor is the choice of components used to mechanize this system. Thus, multiple matrices may be stored in the system that correspond to any manner of information that can be stored concerning the food menu items and their recipe ingredients and optional recipe ingredients, costs of these options, etc. (see, e.g., FIG. 7).

Referring to FIG. 3, an exemplary embodiment of a system 300 for "dynamic pricing" of all or some menu food items is depicted. FIG. 3 depicts a schematic block diagram of a point of sale system 300 and that runs a dynamic pricing method in a food service industry environment (retail food service, caterer, bakery, etc.) in accordance with an exemplary embodiment. The drawing illustrates a typical operator or customer-user Point Of Sale (POS) interface 303 from which the customer-user is presented with a menu misting of food menu items (also referred to as a food menu item listing) along with a price for a choice of a food menu item.

The system 300 hardware architecture requires a computing device, such as a Central Processing Unit (CPU) as a processor, a microprocessor, a Field Programmable Gate Array (FPGA) 304, a Microcontroller, a Digital Signal Processor (DSP) and/or a Graphics Processing Unit (GPU), or any combination of these; or the system 300 may have real-time processing performed remotely (i.e., a distributed processing system) over a network connection to a remote server having the same (where "remote" should be understood that such a component can be located at any distance to the system 300, but requires a network connection for accessibility as well-known in the network computing field, and all attendant hardware components should be understood to be included). The computing device executes software instructions stored in at least one memory element 302 to perform a software application that implements the inventive methods and processes described herein. The computing device is connected to a memory bus and Input/Output (I/O) bus, as is well-known in the computing arts. The system 300 hardware architecture can take many acceptable forms that can implement the processes and functions disclosed herein, and a system 300 typically consists of a Central Processing Unit (CPU) computing device as shown in FIG. 3, database (DB) non-volatile memory storage unit 301, at least one memory element 302 (which may be another non-volatile memory element that includes a DB non-volatile memory storage unit 301 and/or consist of a volatile or cache memory element), communication interfaces (customer-user terminal) 303, and a custom FPGA Pricing Calculator Processor as a second computing device 304, all used to perform this invention software program pricing and control. Typicality should not be viewed as limiting as the components comprising FIG. 3 are not intended to limit the scope of the invention.

The embodiment shown in FIG. 3 is only one example of many possible configurations of a POS computer system 300 (the computer system may be a networked computer system, a local point of sale computer system, or a combination of these) having at least one memory element 302 with software modules (containing instructions for performing the processes and steps disclosed below), stored data (preferably stored in a database 301 in the at least one memory element accessible to the system 300—the at least one memory element 302 is shown as separate from the database element 301 in FIG. 3, but it should be understood that this is just one possible configuration for system 300), and algorithms for implementing the dynamic pricing methods 1 described below. For example, as shown in FIG. 3, a point of sale (POS) computer system 300 includes a central processing unit (CPU) or other processor device(s) for controlling overall operation of the system, one or more databases 301, a memory element 302, and one or more communication interfaces (customer-user terminal) 303 for communicating with a user (e.g., via user input/output devices, such as a monitor, display, keyboard, one or more touch-screens, microphones used for voice entry, and/or other well-known and useful means for interfacing with a user), which may include other computer systems and/or data sources (e.g., over a network) such as a smartphone running a dedicated application ("app") or a web app accessible by a network browser as a user interface application. The memory element 302 includes a number of software programs, modules, and data sets for menu data (e.g., data entries related to food items in a particular restaurant or other food service associated with the system), food costing data, food nutrition data, one or more application modules and/or other instructions (e.g., an operating system for overall control and interface with system components, web services for managing network communications, and/or processing web pages or other content). In some embodiments, as shown in FIG. 3, application modules may include a point-of-sale system (POS) 300 (such as one or more displays with input means), user data, algorithms for dynamic pricing methods, and/or administration tools that may be accessible and used by either or both the food service-user and the customer-user depending on the user restrictions based on an entered passcode or dedicated type of user terminal (customer-user specific or food service-user specific), for example. In some embodiments, as shown in FIG. 3, a custom designed Field Programmable Gated Array (FPGA) 304 is used to process the dynamic pricing method algorithm in which contains embedded EAROM memory chips programmed with confidential pricing data (by way of example only, confidential pricing data may contain expected or required profit margin bounds for a food menu item and/or individual ingredient components of the same).

Figure 4:
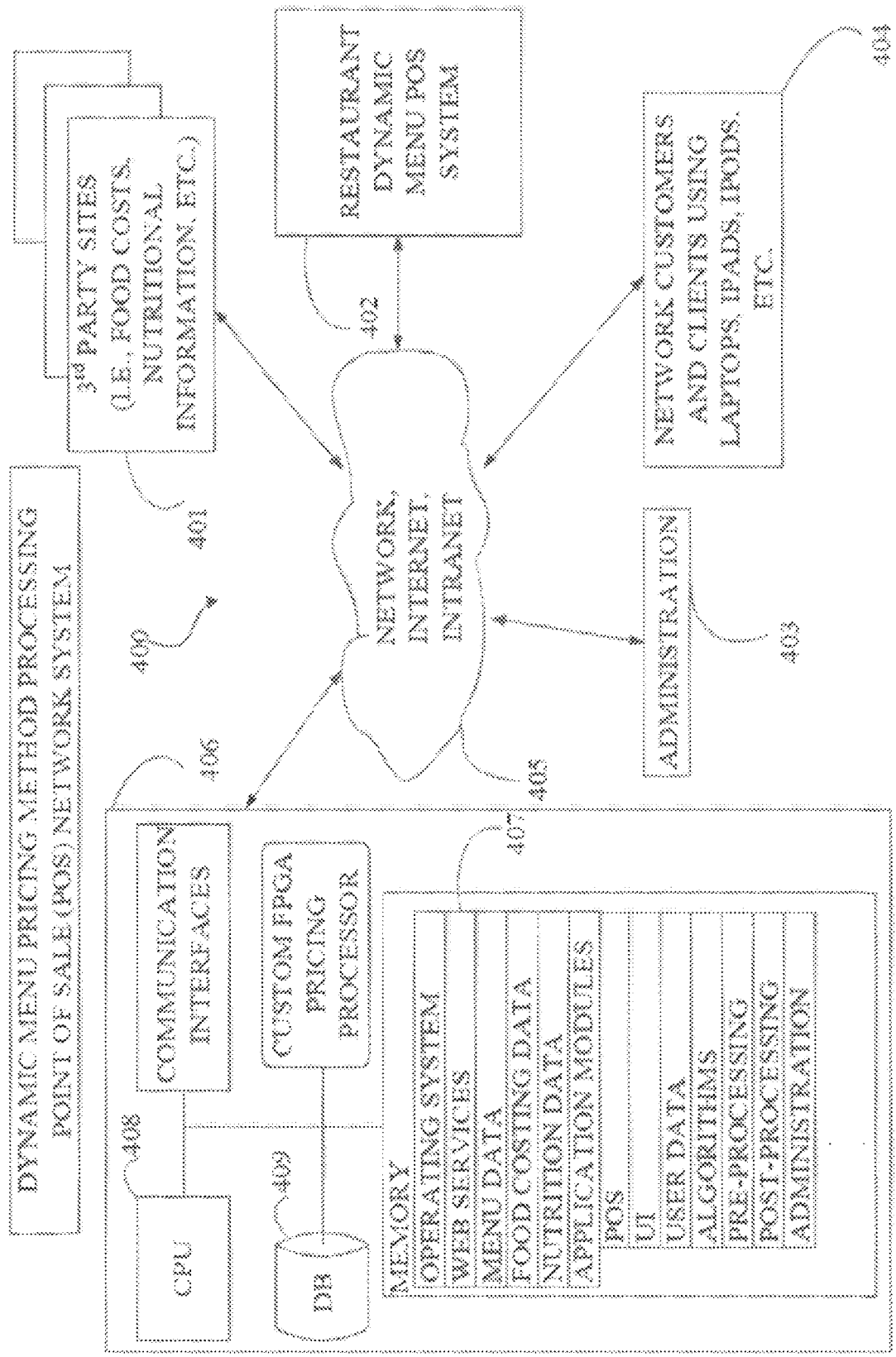
FIG. 4 is a schematic block diagram of a method for dynamic pricing POS Network system. The Network allows for remote communication of all or some menu item contents in accordance with an example embodiment herein this document.

Turning now to FIG. 4, another exemplary embodiment of a dynamic pricing system 400 is shown that includes a network environment configuration. As described above, one skilled in the art will appreciate that the systems and methods of the present invention described herein may be embodied in a stand-alone system 300 exemplified in FIG. 3, a network system 400 exemplified in FIG. 4, or any combination thereof. As shown in FIG. 4, a server system 406 may include a number of application modules stored in a memory 407 that are implemented for receiving, processing, and delivering information for dynamic pricing of food menu items, and for communicating with a user (i.e., a restaurant-user and/or customer-user) over a network 405 through a point of sale system 402 (see FIG. 3 for details of an exemplary embodiment) or other device 404 (e.g., a desktop computer, a laptop computer, tablet, smartphone, or another mobile, remote, and/or handheld device). In some embodiments, the POS system 402 or other devices 404 may include one or more dedicated software applications (system "apps") for interacting with a user to display and/or receive information related to the configuration, pricing, and/or ordering of food menu items from the corresponding retail food service. In some embodiments, the system 400 may communicate over the network 405 with third party sources 401, e.g., for capturing or rece1vmg food/ingredient cost information, calorie/nutritional information, food menu listings, images, information from a corporate/managerial authority, or other desired data and/or content.

As shown in FIG. 4, an exemplary schematic block diagram of a network environment configuration of a system 400 for dynamic pricing of some or all of the food menu items of a retail food establishment. The network environment configuration of dynamic pricing system 400 allows for remote communication of all or some menu items that are capable of modification in accordance with the methods of the present invention. A network customer-user accessing the system 400 through a remote device 404 can gain access to the food menu item listing of the retail food establishment, place an order with food menu item modification according to the methods of the present invention, and receive a dynamic pricing process response on a display of remote device 404. The processing of the order is handled by the CPU 408. The customer-user can access information stored in database 409 (or directly from third party sources 401 or from memory of a POS system 402 located at the retail food establishment) about food menu item(s), including ingredients, pricing, etc. In a particularly advantageous embodiment, all database and information access and/or customer-user input information is tracked and stored in a memory element via the administration component connection 403 (the administration component 403 memory may be located locally or remotely, e.g., at the server 406). The components comprising FIG. 4 are not intended to limit the scope of the invention. The administration component 403 includes software for allowing the retail food establishment personnel access to the POS system 402 memory for entering and/or revising data entries stored in matrices and other databases, as well as reading order tickets for modified food menu item recipes.

Figure 5:
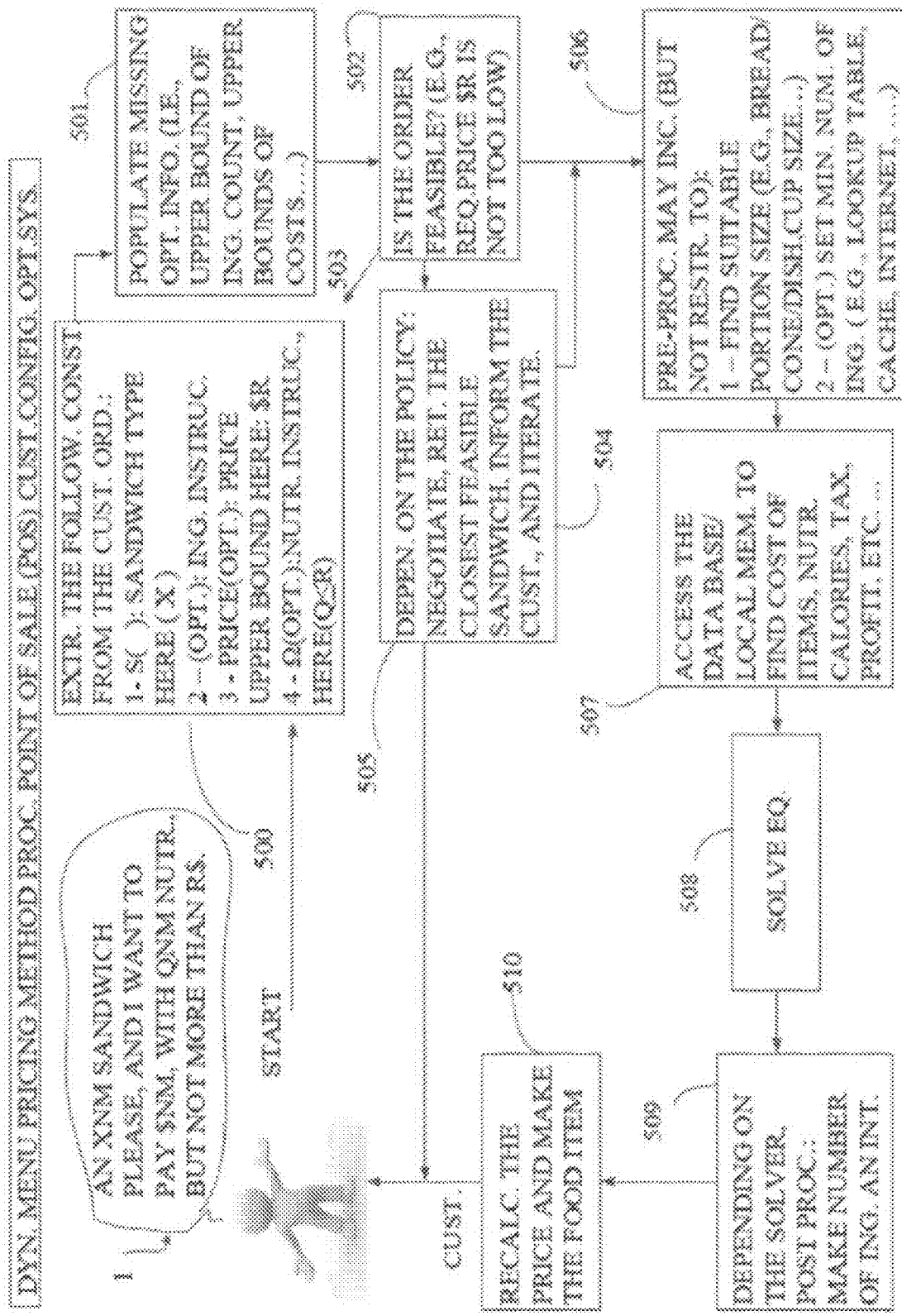
FIG. 5 is a schematic block diagram and flow chart of a POS process for a dynamic pricing Customer Configuration Option System, with an example embodiment herein this document.

Now referring to FIG. 5, an exemplary schematic block diagram of a method 1 for dynamic pricing using a customer configuration option system (e.g., 300 & 400) starting at step 500. A customer-user may desire to modify a food menu item listed on a menu item listing. The system displays on a customer interface, such as a user terminal, an option to order a food menu item by selecting a food menu item from a food menu item listing and/or to select a new of existing food menu item by selecting one or more characteristic bounds. In some embodiments, the characteristic bounds may include modification requests or requirements directed by the customer-user. The method 1 begins by receiving modification request/requirement bounds input by the customer-user. These bounds in step 500 may include one or more of the following non-exhaustive list: food menu item or food menu item characteristic, such as ingredient components, pricing, nutritional value, calories, dietary restrictions (omissions from recipe ingredients), etc. The system will populate information contents at step 501 and provides instructions to the system based on the input received from the customer-user as to what is desired of the ingredient content of the selected food menu item. The system receives and processes these instructions at step 502, and the system determines whether the processed information is feasible or not for the modification request/requirement bounds input by the customer-user. If not feasible, step 503 is activated to return the customer-user and the system displays to step 500 with a message that one or more bounds and/or modifications are not possible. The method 1 may provide instructions to correct the errors by inputting a different value by the customer-user in the offending fields. In preferred embodiments, the method will proceed to step 504 and provide the closest possible match for the bounds and/or modifications provided by the customer-user in the event of an otherwise infeasible request for modification. If the requested modification is feasible the method will proceed (step 505 involves a return of revised requested input by the customer-user after step 504; while step 506 involves a selection where the modification requested by the customer-user is stored in an optional pre-processed form-such as anticipated feasible modifications allowed by the retail food establishment). If a feasible modification is not among the optional pre-processed data, the system is instructed to then proceed to step 507 to access the database-stored information (such as in Matrix A 100 and Matrix B 200) or provided by networked sources (such as third-party sources 401) and processes the information at step 508 to determine the solution to the customer-user's order with modifications that meet the customer-user's bounds (may include one or more solutions, depending on the information retrieved and the bounds received from the customer-user). The final food item solution is processed at step 509 to provide the retail food establishment a recipe with size/portion of individual ingredients to a restaurant-user to prepare the modified food item. At step 510 final food item solution, the system processes the final food item solution in comparison to the cost tables (e.g., Matrix B 200) to provide a final price of the modified food item to the retail food establishment that is within the received pricing bounds (if input by customer-user at step 500). Optionally, the final food item solution and/or final price that are processed at step 510 may be provided to the customer-user for acceptance or rejection prior to the order being completed by the restaurant-user.

Figure 6:
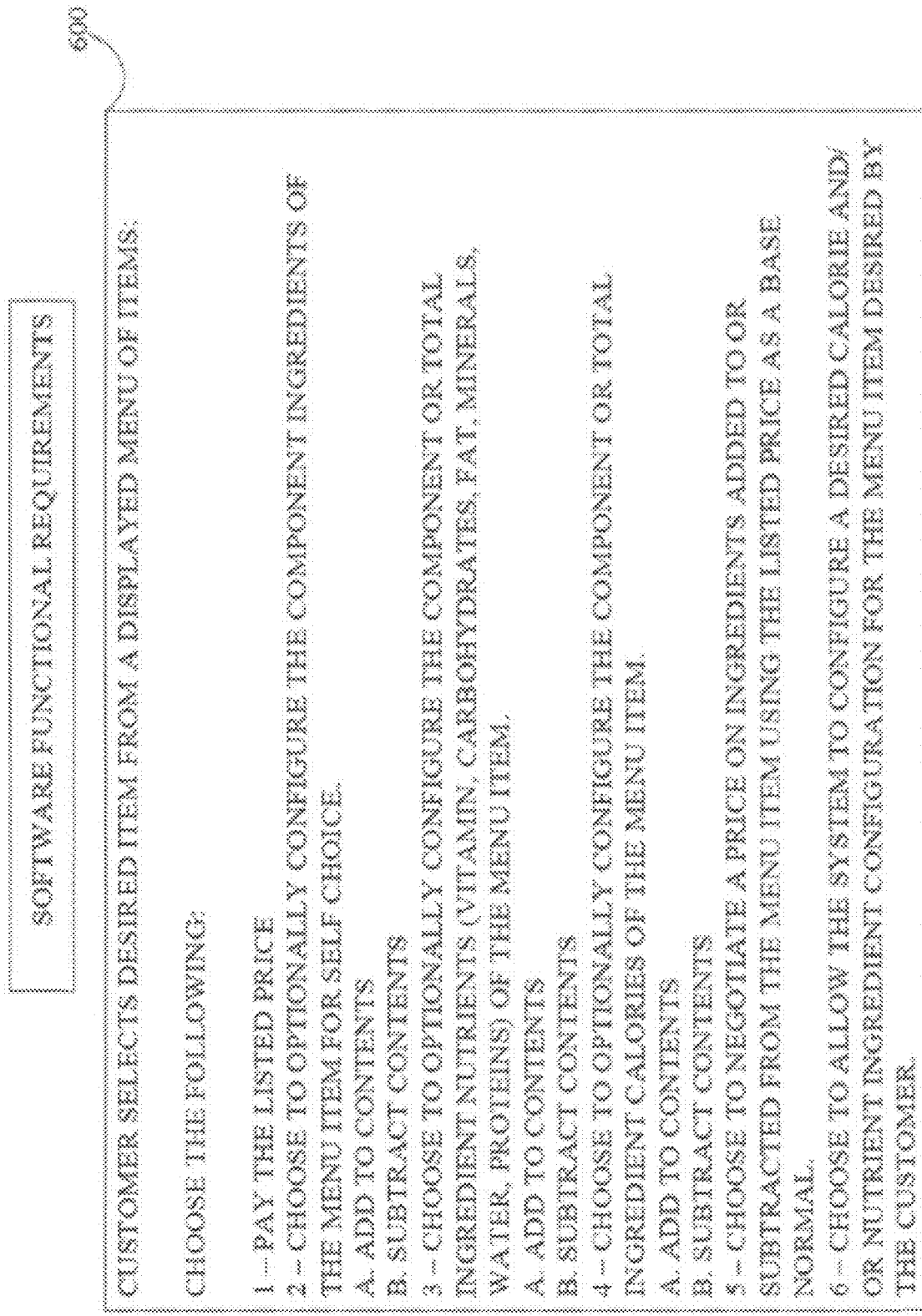
FIG. 6 is a schematic block diagram of a method for dynamic pricing system Software Functional Requirements Pseudo Code, to implement this Matrix driven architecture invention as described and claimed herein this document.

A schematic block diagram is shown in FIG. 6 for software function requirements of an exemplary method of dynamic pricing providing minimum choices for a customer-user's configuration/modification of a food menu item. Customer-user options (choices 1 to 6 with sub-options A, B, etc.) for food menu item selection are written 600, to guide the programmer to achieve the input and output responses for this invention and a food menu item as requested by a customer-user. It should be understood that each "choice" of a customer-user corresponds to an input received, stored, and/or processed by the system components in the methods of the present invention.

Figure 7:
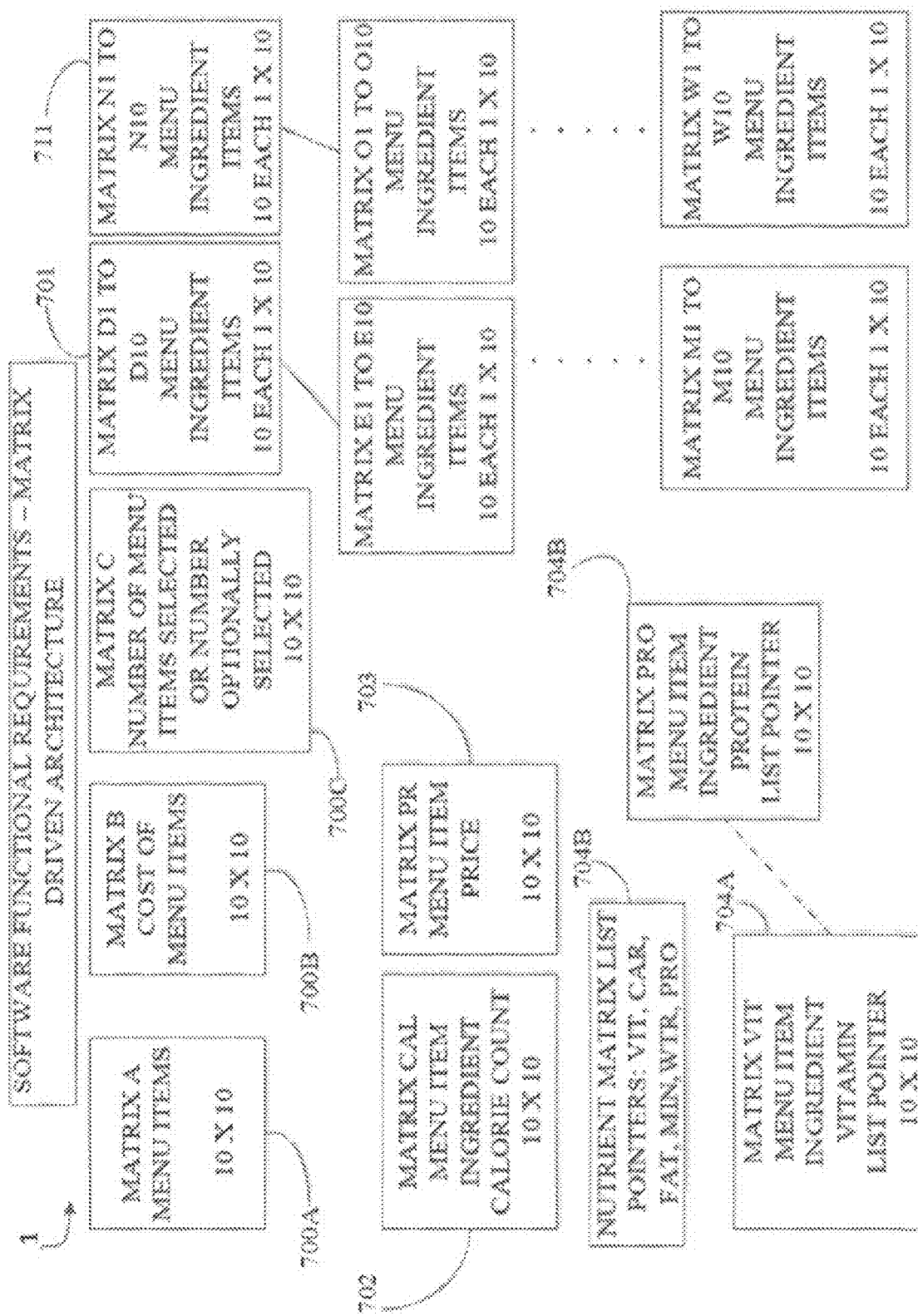
FIG. 7 is a schematic block diagram of a design method for dynamic pricing Software Functional Requirements using Matrix elements to drive and mechanize the architecture for this invention, according to some embodiments.

Shown in FIG. 7 is a schematic block diagram corresponding to an exemplary dynamic pricing system (e.g., 300 and 400) using matrix elements. Thus, this also describes the integral software requirements of software application of the system that accesses and utilizes such matrix data architecture. Matrix A 700A and Matrix B 700B elements are mapped for available food menu items and costs per item, respectively. Matrix C 700C is a dynamic pricing entry input by a customer-user and received by the system, as to how many of each food menu item is/are desired. Matrix C 700C provides discrete cost information for the pricing processing algorithm and formula. Matrix D through Matrix M 701, are stored matrix listings of ten ingredients each (1×10 in this example) for each available food menu item. The restricted ingredients that cannot be modified are ordered (selected) first in the element structure. As one example of this architecture, the base food menu item, Hamburger, is an item that cannot be modified, but certain of its recipe ingredients are. A bun or meat patty may be an option for this example food menu item, such that a bun-less Hamburger can be requested by a customer-user (i.e., the bun can be completely removed or replaced by another ingredient, such as sliced bread, brioche bread, or iceberg lettuce). In another example, the bun and meat patty are not an option that can be changed in the system for this food menu item, but all other ingredients are. Those base items and/or base ingredient components that are set (predefined) by the restaurant-user as not be modifiable, thus, are selected and populated into the system first. Matrix N through Matrix W 711 are matrix elements structured in lock-step with Matrix D through Matrix M 701 for cost per ingredient of the Menu Item. Matrix CAL 702, is a calorie number matrix element in lock-step with either Matrix D through Matrix M 701 and/or Matrix N through Matrix M 711 ingredient matrix elements. Matrix PR 703 contains matrix elements in lock-step with Matrix A 700A food menu item elements, that are the fixed price per item listed on the food menu as therein described and without modification. Nutrient Matrix Y 704A is the vitamin list pointer elements for the food menu item ingredients corresponding in lock-step with the ingredients matrix elements Matrix D through Matrix M 701 and may be further divided into separate corresponding matrices 704B for other applicable nutrient/health information to Nutrient Matrix CA, Nutrient Matrix FAT, Nutrient Matrix MIN, Nutrient Matrix WTR, and Nutrient Matrix PRO.

Figure 8:
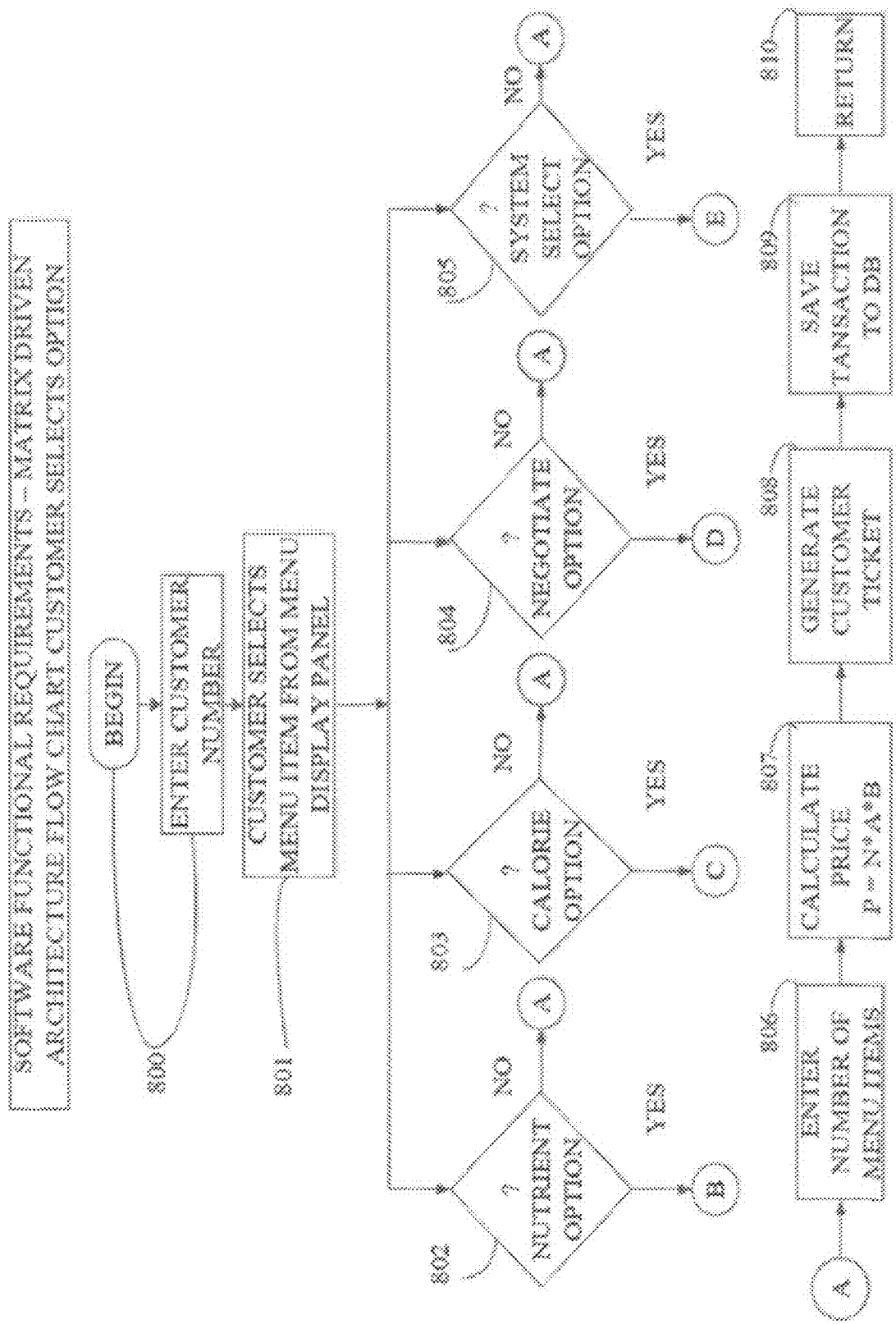
FIG. 8 is a schematic flow chart of a design method for dynamic pricing Software Functional Requirements Flow Chart using Matrix driven architecture, according to some embodiments.

Shown in FIG. 8 is a schematic block diagram corresponding to an exemplary dynamic pricing method 1 that employs a system (e.g., 300 and 400) using matrix elements.

A customer-user enters an existing customer number into the system at step 800. Alternatively, the system software application may generate a customer and/or order number at step 800. The customer/order number(s) may be stored in an administrative element (see FIG. 4) or database (809) and used by the system to track customer-user orders, preferences, payment options, delivery location(s), etc. The customer-user will then select a food menu at step 801. At step 802, the customer-user is provided with an option to select an option of ingredient modification/configuration of the selected food menu item based on nutrient characteristics. At step 803, the customer-user is provided with an option to select an option of ingredient modification/configuration of the selected food menu item based on calorie characteristics. At step 804, the customer-user is provided with an option to select an option of ingredient modification/configuration of the selected food menu item based on pricing. At step 805, the customer-user is provided with an option to select an option of ingredient modification/configuration of the selected food menu item based on one or more of nutrient, calorie, and price characteristics and allows the system to select or propose a "best-fit" option. If no option is selected at steps 802 to step 805 (or if an option is subsequently deselected), the customer order of the food menu item is processed by moving to process "A" and completing steps 806 to 809, which generally summarizes the selected food menu items 806, calculates the price 807, generates a customer price ticket 808, save the transaction 809 (as well as other information, such as customer/order number, customer information, etc.), and then returns the customer-user to the main menu 810. If an option is selected by the customer-user and received by the system at steps 802 to step 805, the customer order of the food menu item is processed by moving to processes "B", "C", "D", and/or "E". More detail of these process steps are described below and examples shown in FIGS. 9-17.

Now referring to FIG. 9, shown is a schematic block diagram of an exemplary prose pseudo code representing software for a dynamic pricing method 1 and system (e.g., 300 and 400) corresponding to the method steps shown in FIG. 8. The Prose block 900 corresponds to the complete method if no option of a modification/configuration of a food menu item and its recipe ingredients is selected in the food menu item listing. In that case of no option being selected or if an option is subsequently deselected, the system processes the order through the system as described in the prose block 901. In prose block 902, a price ticket is generated, the order is memorialized, and the system program returns to the main menu for accepting another order. As an example of a matrix information access and processing associated with the prose blocks 900 to 902, Matrix D ingredient elements row 1 column 1 to 10 content are described as a pointer listing for the Menu Item Matrix A of a Hamburger food menu item's ingredients and Matrix N is a numerical element showing ingredient cost per food menu item ingredient 903.

Figure 10:
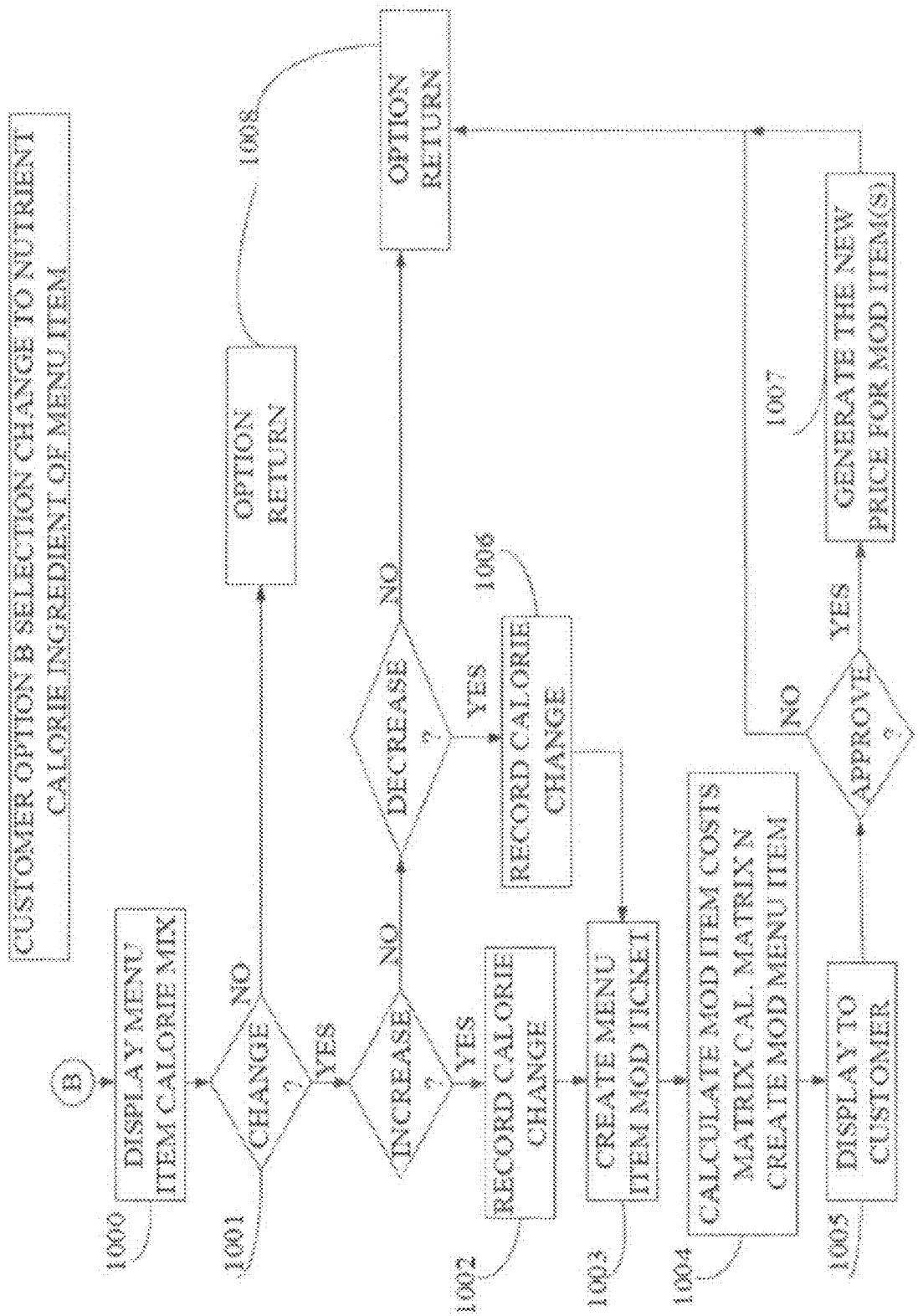
FIG. 10 is a schematic flow chart diagram of a dynamic pricing process of customer-user selected Option B of this System, according to some embodiments.

Shown in FIG. 10 is a schematic block diagram corresponding to an exemplary dynamic pricing method 1 that employs a system (e.g., 300 and 400) using matrix elements and further steps through process option "B" (see FIG. 8). The customer-user enters the process option "B" at step 1000 with the system displaying a menu or prompt to enter, choose, or otherwise select a calorie request bounds, and then selects an option of food menu item ingredient calorie modification/configuration at step 1001. If no option is selected step 1001, a return step 1008 is processed, and system returns the customer-user to a previous menu or application page. If the customer-user selects to increase or decrease the calorie bounds option at step 1001, the increase or decrease calorie total then is stored in the system at steps 1002, 1006, respectively. At step 1003, the system generates a food menu item modification ticket that includes the customer-user bounds and/or modifications stored at 1002 or 1006. At step 1004, the system then processes the modified food menu item as described above to calculate pricing and recipe components using stored or accessed data in appropriate matrix elements. The system displays the processed pricing and/or recipe components to the customer-user at step 1005, and the customer-user may approve or reject the change at step 1005. A rejection at step 1005 will create a return step 1008, and an approval will prompt the system to generate a new price ticket at step 1007. The system program will finally initiate a return step 1008.

Figure 11:
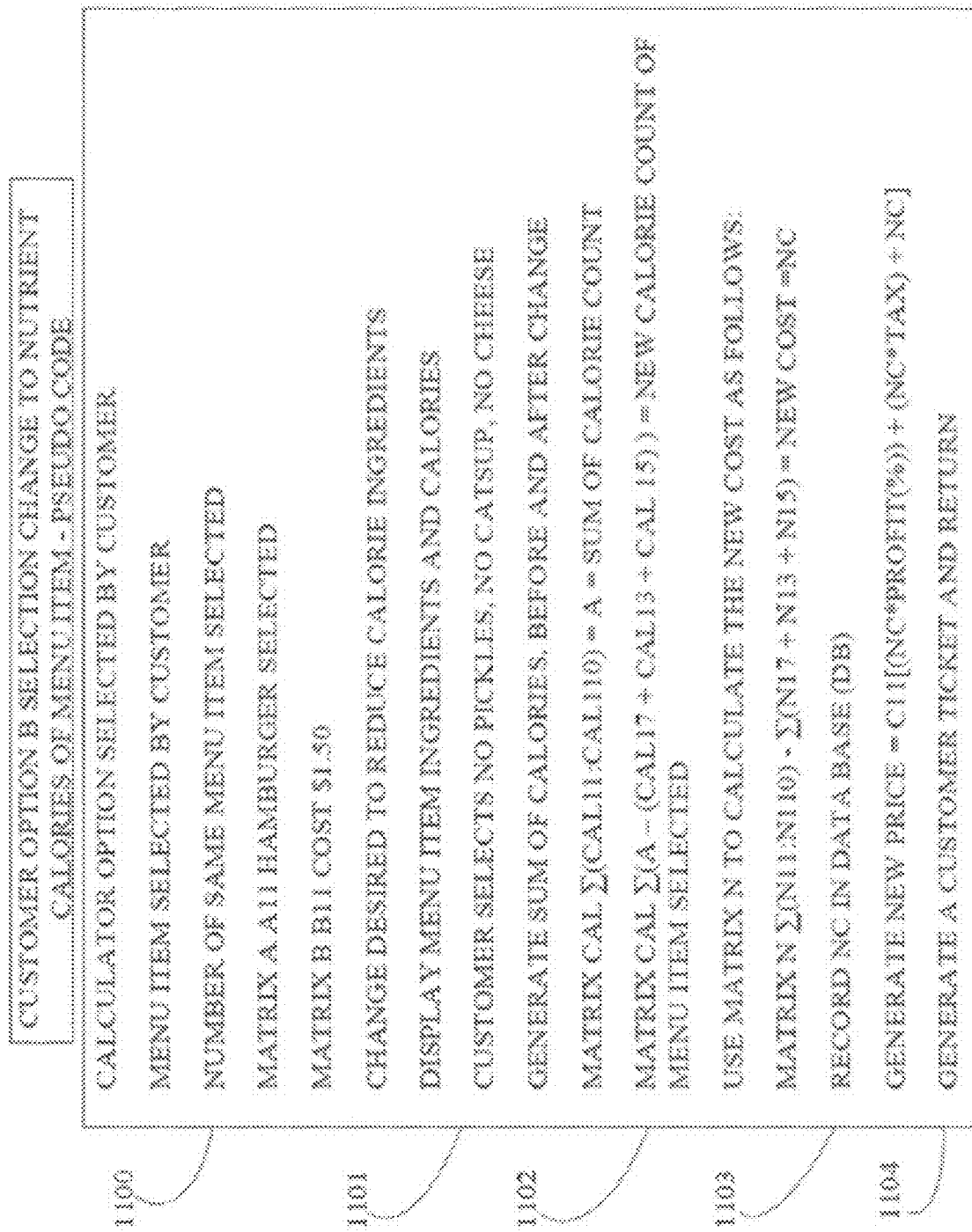
FIG. 11 is a schematic block diagram of prose Pseudo Code to describe the software dynamic pricing process of customer-user selected Option B, according to some embodiments.

Now referring to FIG. 11, shown is a schematic block diagram of an exemplary prose pseudo code representing software for a dynamic pricing method 1 and system (e.g., 300 and 400) corresponding to the method steps shown in FIG. 10 for option "B". The Prose block 1100 corresponds to the base food menu item and cost information from appropriate matrices. The customer-user selects an ingredient calorie reduction selection option of the food menu item ("Hamburger") modification/configuration in prose block 1101. An ingredient change is selected by customer-user to reduce the calorie content of the food menu item in this example. In prose block 1102, the calorie content and ingredient cost of the food menu item is processed for customer-user review and approval or rejection of the modification instructions. The appropriate matrices accessed for this function are Matrix CAL and Matrix N. A price ticket is generated within the prose block 1103 and stored to the database. The system program generates a new customer ticket and returns the customer-user to the main menu in prose block 1104.

Figure 12:
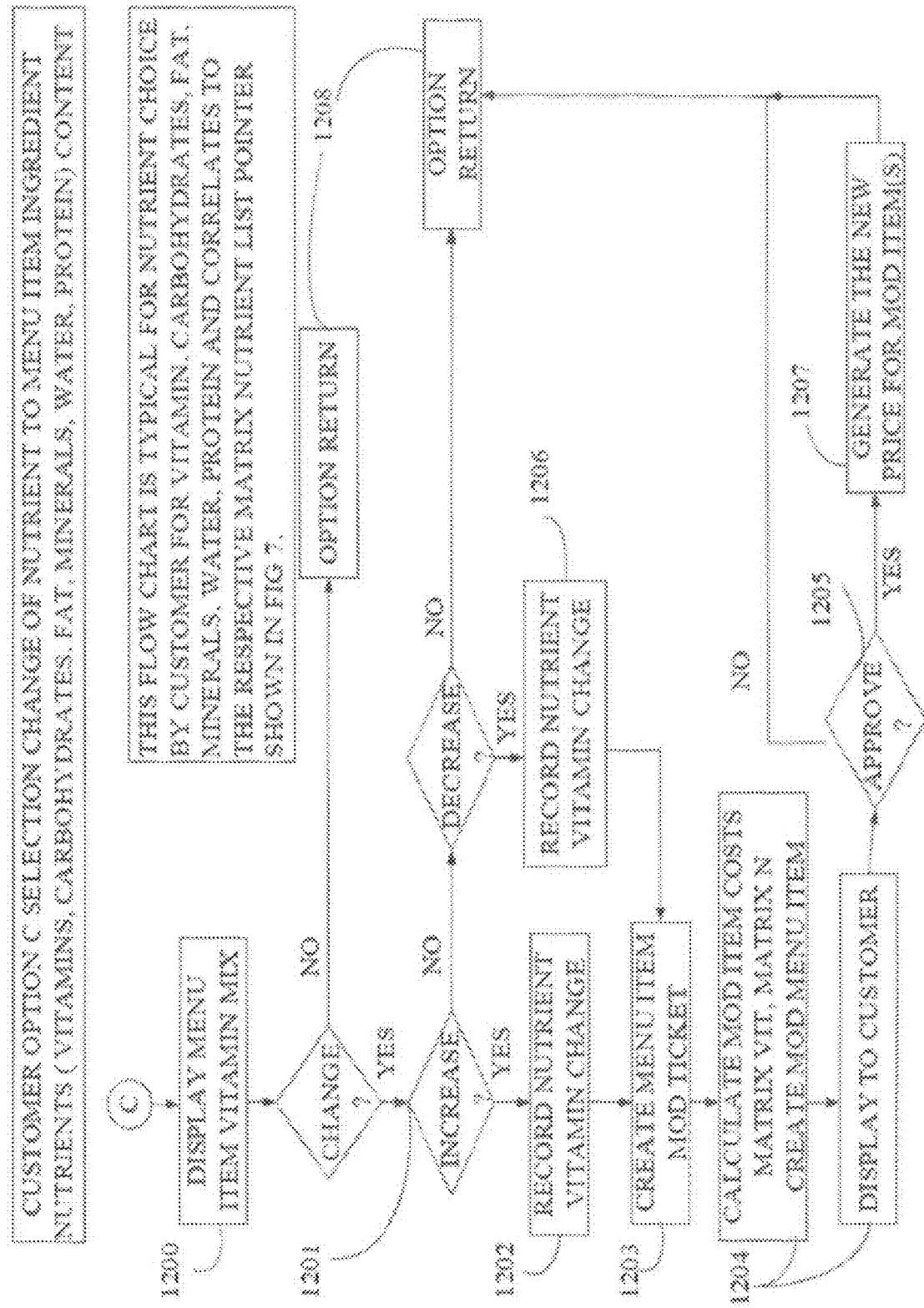
FIG. 12 is a schematic flow chart diagram of a dynamic pricing process of customer-user selected Option C of this System, according to some embodiments.

Shown in FIG. 12 is a schematic block diagram corresponding to an exemplary dynamic pricing method 1 that employs a system (e.g., 300 and 400) using matrix elements and further steps through process option "C" (see FIG. 8). The customer-user enters the process option "C" process at step 1200 with the system displaying a menu or prompt to enter, choose, or otherwise select a nutrient (e.g., vitamins, minerals, carbohydrates, fats, water, protein, etc.) request bounds, and then selects an option of food menu item nutrient ingredient modification/configuration at step 1201. If no option is selected at step 1201, a return step 1208 is processed, and the system returns the customer-user to a previous menu or application page. If the customer-user selects to increase or decrease the nutrient bounds option at step 1201, the increase or decrease in nutrient total then is stored in the system at steps 1202, 1206, respectively. At step 1203, the system generates a food menu item modification (MOD) ticket that includes the customer-user bounds and/or modifications stored at 1202 or 1206. At step 1204, the system then processes the modified food menu item as described above to calculate pricing and recipe components using stored or accessed data in appropriate matrix elements. The system displays the processed pricing and/or recipe components to the customer-user at step 1205, and the customer-user may approve or reject the change at step 1205. A rejection at step 1205 will create a return step 1208, and an approval will prompt the system to generate a new price ticket at step 1207. The system program will finally initiate a return step 1208.

Figure 13:
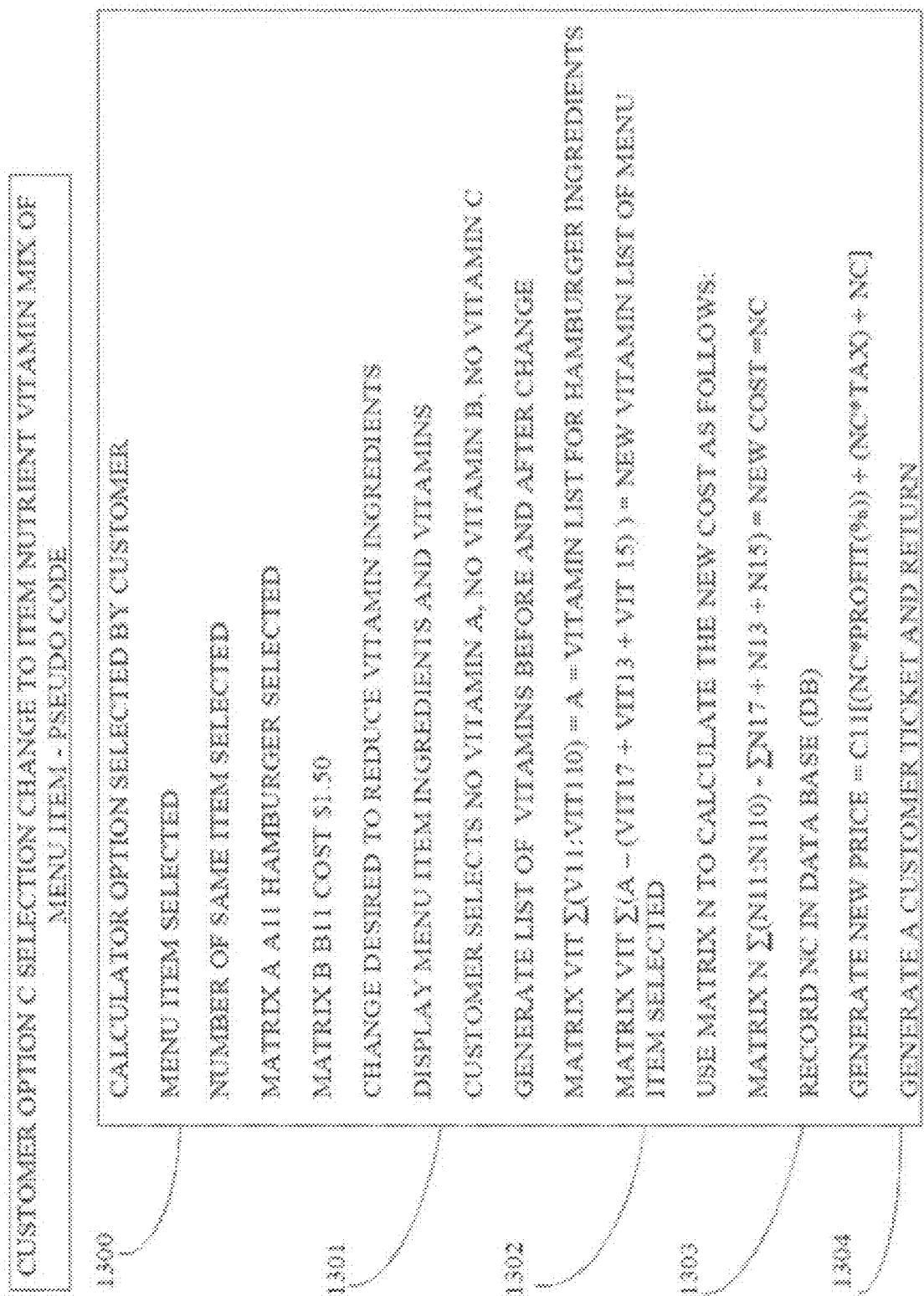
FIG. 13 is a schematic block diagram of prose Pseudo Code to describe the software dynamic pricing process of customer-user selected option C, according to some embodiments.

Now referring to FIG. 13, shown is a schematic block diagram of an exemplary prose pseudo code representing software for a dynamic pricing method 1 and system (e.g., 300 and 400) corresponding to the method steps shown in FIG. 12 for option "C". Prose block 1300 corresponds to the base food menu item and cost information from appropriate matrices. The customer-user selects an ingredient vitamin reduction selection option of the food menu item ("Hamburger") modification/configuration in prose block 1301. An ingredient change is selected by customer-user to reduce the vitamin content of the food menu item in this example. In prose block 1302, the vitamin(s) content and ingredient(s) cost of the food menu item is processed for customer-user review and approval or rejection of the modification instructions. The appropriate matrices accessed for this function are Matrix VIT and Matrix N. A price ticket is generated within the prose block 1303 and stored to the database. The system program generates a new customer ticket and returns the customer-user to the main menu in prose block 1304. The prose pseudo code shown in FIG. 13 is applicable to other processes for changing a characteristic of a food menu item in the dynamic pricing methods and systems disclosed herein, such as vitamins, calories, carbohydrates, fats, minerals, water, protein, and others, which correspond to the various matrices nutrient pointers shown in FIG. 7.

Figure 14:
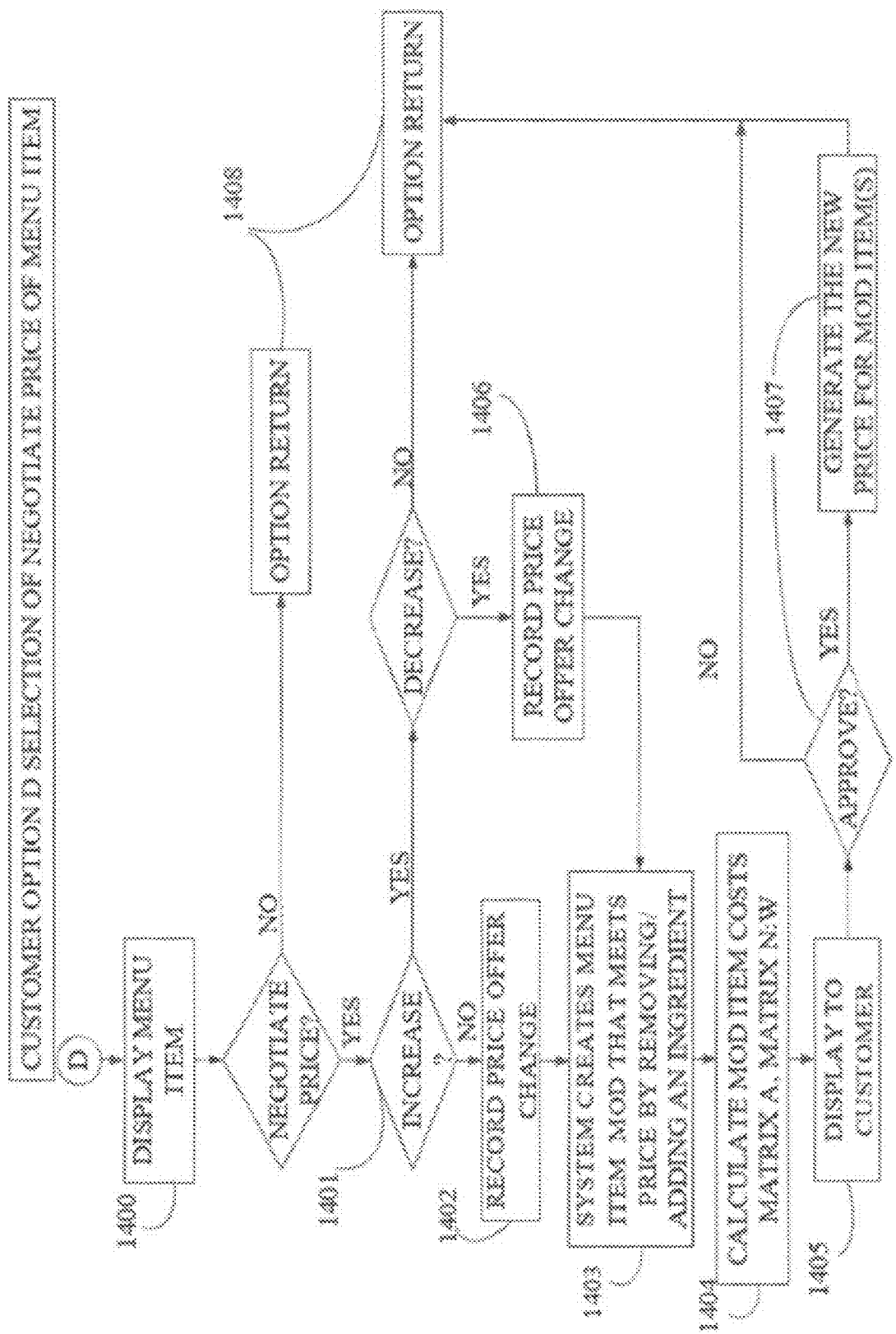
FIG. 14 is a schematic flow chart diagram of a dynamic pricing process of customer-user selected Option D of this System, according to some embodiments.

Shown in FIG. 14, is a schematic block diagram of an exemplary dynamic pricing method 1 that employs a system (e.g., 300 and 400) using matrix elements and further steps through process option "D" (see FIG. 8). The customer-user enters the process option "D" at step 1400 with the system displaying a menu or prompt to enter, choose, or otherwise select a price request bounds (i.e., a negotiation or offer for a change in price of a food menu item or custom food item not on the food menu item listing), and then selects an option of food menu item pricing modification/configuration at step 1401. If no option is selected 1401, a return step 1408 is processed, and system returns the customer-user to a previous menu or application page. If the customer-user selects to increase or decrease the pricing bounds option at step 1401, the increase or decrease of pricing total then is stored in the system at steps 1402. 1406, respectively. At step 1403, the system generates a food menu item modification ticket that includes the customer-user bounds and/or modifications stored at 1402 or 1406 (in this case by increasing, removing, or otherwise altering ingredient items). Food menu item Matrix PR elements may be scanned by the system for a comparable match as a pre-processed option (not shown). At step 1404, the system then processes the modified food menu item as described above to calculate pricing and recipe components using stored or accessed data in appropriate matrix elements, with the cost Matrix C scanned for a close match 1404. The system displays the processed pricing and/or recipe components to the customer-user at step 1405, and the customer-user may approve or reject the change at step 1405. A rejection at step 1405 will create a return step 1408, and an approval will prompt the system to generate a new price ticket at step 1407. The system program will finally initiate a return step 1408.

Now referring to FIG. 15, shown is a schematic block diagram of an exemplary prose pseudo code representing software for a dynamic pricing method 1 and system (e.g., 300 and 400) corresponding to the method steps shown in FIG. 14 for option "D". The Prose block 1500 corresponds to the base food menu item and cost information from appropriate matrices. The customer-user selects a pricing reduction or increase selection option of the food menu item ("Hamburger") modification/configuration in prose block 1501. Here the customer-user has selected a maximum or minimum price that she is willing to pay for the food menu item. Then price Matrix PR and/or cost Matrix C are scanned for a comparable matchup. Recipe ingredient components and ingredient cost of the selected food menu item is processed. In prose block 1502, the pricing with modified ingredient components of the food menu item is processed for customer-user review and approval or rejection of the modification instructions. The appropriate matrices accessed for this function are Matrix PR and/or Matrix N. A price ticket is generated within the prose block 1503 and stored to the database once approved by the customer-user. The system program then generates a new customer ticket and returns the customer-user to the main menu in prose block 1504. If the pricing request does not meet with system approval in prose block 1504, the customer-user is notified and then the system returns to next entry and option selection.

Figure 16:
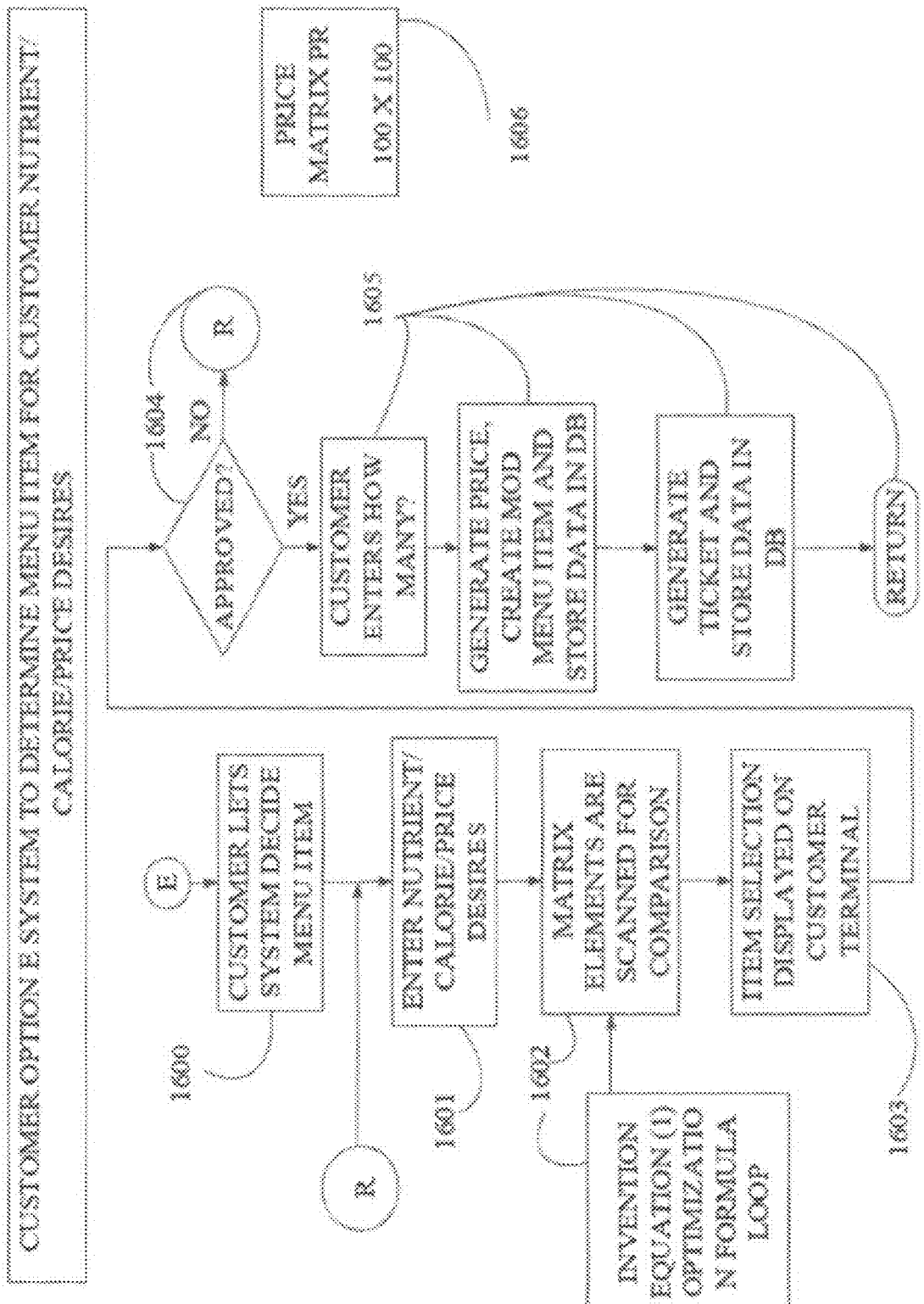
FIG. 16 is a schematic flow chart diagram of a dynamic pricing process for customer-user selected Option E of this System, according to some embodiments.

Shown in FIG. 16 is a schematic block diagram corresponding to an exemplary dynamic pricing method 1 that employs a system (e.g., 300 and 400) using matrix elements and further steps through process option "E" (see FIG. 8). The customer-user enters the process option "E" at step 1600 with the system displaying a menu or prompt to allow the system to select a food menu item based on bounds to be entered or otherwise selected by the customer-user. In other words, the customer-user selects an option on the menu (the selected food menu item) at the prompt that may or may not exist in the stored data sets or matrices. The customer-user is then prompted at step 1601 to choose a requested bounds for one or more of modifiable options, such as nutritional ingredient content, calorie ingredients content, or price amount willing to pay, and the system receives these bounds. Any bounds entered by the customer-user are stored in the system. At step 1602, the system then scans the stored matrix elements to find an appropriate food menu item(s) meeting the instructions generated at step 1601. By way of example, the system may implement the formula (I) below to perform the matrix data scanning $\hat{x} = \text{argmax } g(x, L)$ subject to:

$\forall i \in S: x_i = 0$ $\forall i \in S, 1 \leq x_i \leq M_i,$ $x \in H_L \cap H_x$ $T + f_c(x, C) \leq \overline{\text{Cost}}$ \hfill Formula (I)

for comparison to the customer-user input entries. If no option is selected in step 1601, a return step "R" is processed, and system returns the customer-user to a previous menu or application page. A Price Matrix PR is used in this process to quickly compare any pricing bounds input by the customer-user 1606. Also the cost Matrix C may be scanned for a pre-existing close match. A food menu item matching or within the bounds set by the customer-user found in Matrix A (either pre-existing or modified using the system processes described above) will be displayed to the customer-user at step 1603. The displayed options allow for the customer-user to approve or reject the options at step 1604. If rejected at step 1601, a return step "R" is processed, and system returns the customer-user to a previous menu or application page. If approved, the customer-user may enter how many items are desired, a modified food menu item is created (MOD), and a price ticket is generated by the system at step 1605. The system program will then return the display for a new customer-user or entry.

Now referring to FIG. 17, shown is a schematic block diagram of an exemplary prose pseudo code representing software for a dynamic pricing method 1 and system (e.g., 300 and 400) corresponding to the method steps shown in FIG. 16 for option "E". The Prose block 1700 corresponds to a menu option "E" that allows the customer-user to input one or more characteristic bounds on food menu items that the system will then select based on the input received. The system then uses matrix scanning algorithms or formula to find matches or close matches within the bounds set by the customer-user. For example, a price is received by the system for what the customer-user is willing to pay for a fixed nutrient amount and/or a fixed calorie amount. Then the price Matrix PR and cost Matrix C are scanned for optimization by Formula (I) for comparison to the customer-user input bounds for a comparable matchup. The system may advantageously generate modifications of food menu items found in Matrix A in order to yield a match within the customer-user input bounds. Content and ingredient cost of food menu item(s) is/are processed for customer-user approval or rejection of the modified food menu item order at prose block 1700. Thus, if positively retrieved food menu item is found or generated, a modified food menu item or stored food menu item is displayed for customer-user approval at prose block 1701. If unsuccessful or if the item is rejected, the system prompts the customer-user to revise the input bounds for iterative processes at prose block 1702. Once approved, the number of desired items is received and stored, and a price ticket is generated at prose block 1703. A customer/order ticket is also generated, and the information is stored to the database. Once complete or if the process is unsuccessful, the system returns to next entry and option selection at prose block 1704.

Figure 18:
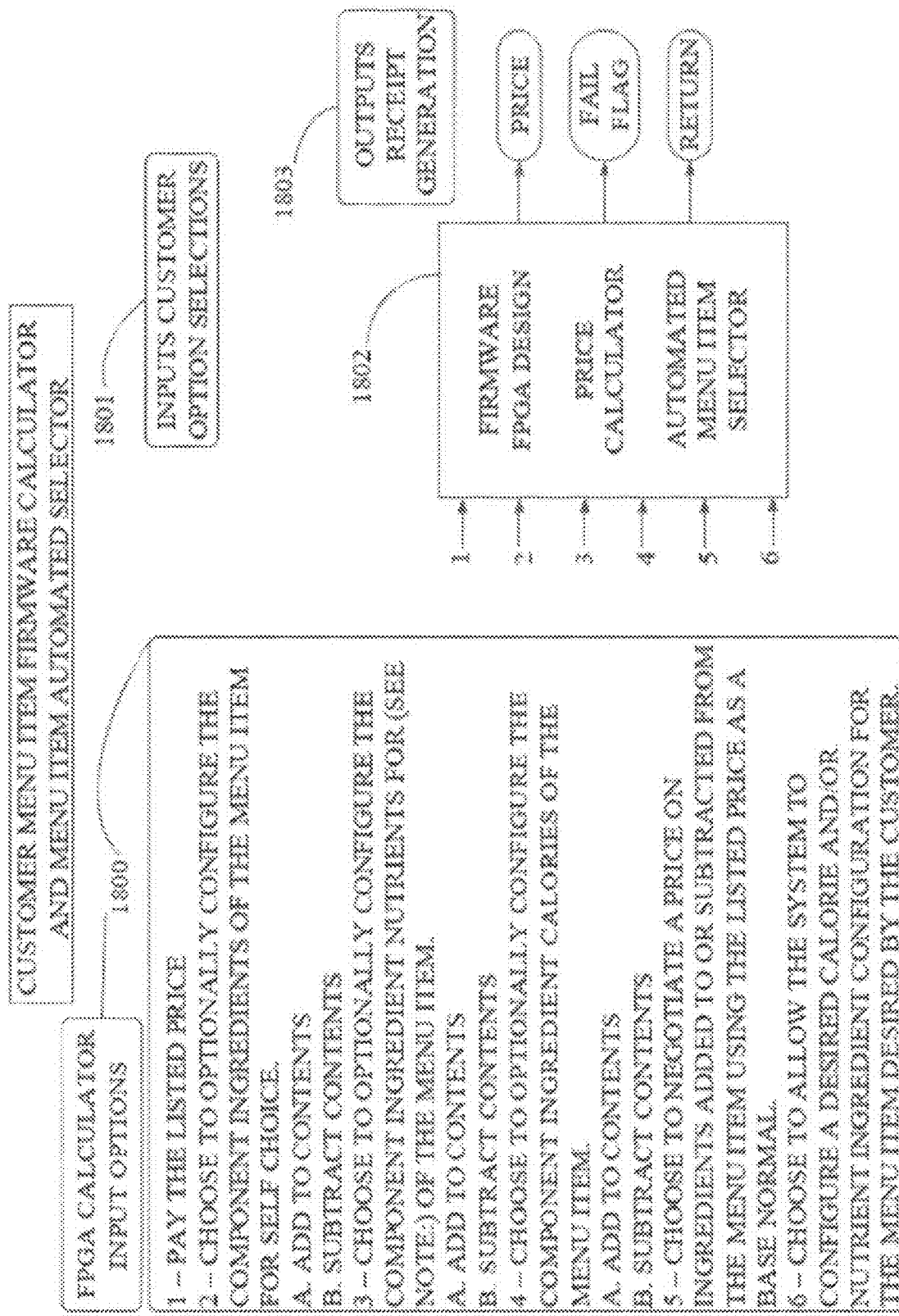
FIG. 18 is a schematic block diagram of software Pseudo Code and a Firmware Calculator block diagram for a dynamic pricing method that responds to a customer-user selected Option A, B, C, D, or E entry. A custom FPGA designed Price Processor can be used to generate the customer-user chosen food item price using Matrix component calculations, and business overhead inputs, according to some embodiments.

FIG. 18 shows a schematic block diagram of an exemplary system price processor for a dynamic pricing customer-user modification/configuration with examples options of "A", "B", "C". "D", and "E". It should be understood that these options are only examples, and also that the system may use any available processor hardware and memory element hardware to perform the processing steps within the software implementing the methods 1 of the present invention. The system, in the embodiment shown in FIG. 18, provides for an FPGA processor and memory chip 1800 that follows the algorithm steps depending on the inputs received from the customer-user. The customer-user, thus, selects an option of how the food menu item is to be configured or determined by the system ("E") 1801. The customer-user enters one of six options (1 to 6 in 1800), and the custom FPGA Price Calculator determines what the price will be based on the input customer-user bounds at the start 1801. The FPGA 1802 performs the processing of the bounds entered and comparison with available food menu items and modifications, and has all necessary and sufficient Matrix elements or material menu and component ingredient listings embedded (or access to such data through other memory elements or networked solutions) for a complete Customer Option Input 1801. After completing the processing, the FPGA provides the results as Menu Processing and Output 1803. This system is otherwise provided in software as in the previous figures as using a CPU, general processor, or network system, see FIG. 4 or FIG. 5, without the custom FPGA.

Examples of methods of using such systems, including implementing algorithms and interacting with a POS system and customer-users, to provide dynamic pricing of all or some items, are discussed in more details below.

EXAMPLES

FIGS. 5 & 6 are schematic block diagrams illustrating the methods of the present invention for dynamic pricing of all or some of the food menu items and interaction with customer-users in the food service industry.

Based on the following example, a total of n distinct ingredients are needed. For instance for Restaurant (e.g., fast food) example: bread types, sauces, and dressing (for instance turkey, roast beef, lettuce, tomato, Italian bread, cheddar cheese, ranch, mayo, and so on).

Ice-cream shop example: different cone types, different ice-cream flavors such as vanilla, strawberry ice-cream, and so on.

Ethnic (e.g., Chinese) restaurant example: fried rice, white rice, orange chicken, fried noodles, Kung-Pao chicken, and so on.

Fruit cup example: slices of banana, pineapple, orange, apple, and so on.

For the simplicity of demonstration, in the rest of this document, focus is made on the fast food example. Note that, different qualities of the same ingredient could be supported in the framework by considering them as different ingredients. For instance, chicken (non-organic) and organic chicken may count as two different ingredients in the aforementioned ingredient list. However, it should be clear that all of these arguments could be generalized to other examples without departing the scope of this invention.

Furthermore, assume that at the disposal, a minimal unit of each of those ingredients can be made or prepared in advance (e.g., one slice of turkey, one slice of roast beef and a small bag of lettuce, a small packet of mayo, one scoop of chocolate ice-cream, one tablespoon size fried-rice, one slice of banana, etc.). Let us denote x; where i ranges from one to n—recall n is the total number of items/ingredients—the number of minimal unit for the i-th ingredients in a given service (e.g., sandwich, ice-cream and son). For an example, assume that 1, 2, 3 and 4 correspond to predefined units of turkey, roast beef, meatloaf, and lettuce, respectively. Then, $x_1=2$, $x_2=1$, $x_3=0$, $x_4=3$ would correspond to 2 slices of turkey, one slice of roast beef, zero slices of meatloaf, and 3 small fixed-size bags of lettuce in this example. We can denote such configuration more compactly in a vector notation by $$x := [x_1 x_2 x_3 \ldots x_n]^T = [2\ 1\ 0\ 3\ 0\ 0\ \ldots]^T \text{ in this example.}$$

For our proposed framework and for each ingredient item, we need a bound depending on the owner desire (e.g., upper bound, average, median or other statistical bounds) for each of following type of information with a "good amount of confidence" (e.g., probability larger than 0.8/out of one) or some other measures (e.g., on average, typical, median, and so on). It should be clear that, this measure of confidence could be selected by the restaurant/retail owner and could be in other forms (e.g., for certain, i.e., a probability of one out of one, any other probability or other senses). Also, these confidence measures could be the same or different per each item without departing the context.

$C_i$: A selected (such as average, median, upper) bound of the price for the minimal unit of the i-th ingredient. Note that, this is the price that a restaurant buys that ingredient. For example, we know that (in our confidence sense, e.g., with a good probability 0.8 out of one or even for sure in other examples), the price for each roast beef slice would be at most 45 cents, considering the deviation in size and types of the roast beef Note that one can define a n×1 column vector C: $=[C_1 C_2 \ldots C_n]^T$ (where T denotes transpose operator). Note, that the retail could set the cost of some items, such as water, salt, pepper or anything he/she desires to zero, effectively making them free.

$P_i$: The profit, we want to have on the i-th ingredient. For example, a restaurant might pay $C_i=50$ cents, to buy the minimal unit of its i-th ingredient; however, the manager decides to sell the same ingredient 55 cents to his/her customer and hence the profit for that particular item will be $P_i=5$ cents. In summary, the customer will pay $C_i+P_i$ for the minimal unit of the i-th ingredient. Clearly this profit could be any real value including zero (no profit) or even negative numbers (corresponding to loss, as being practiced in some chains). In a general case, one can find a function per ingredient, for instance $P_i=f_{p_i}(C_i)$. This could range from constant term (e.g., $f_{p_i}(C_i)=\gamma_i$). linear (e.g., $f_{p_i}(C_i)=\alpha_i C_i + \beta_i$), higher order polynomials (e.g., $f_{p_i}(C_i)=\Sigma_j \alpha_j C_i^j$) or any other type of function in here, depending on the business model which a restaurant adopts. As a final note, it should be clear that, for different ingredients, one can assume different profit functions and hence these functions could be independent or have some correlations. Nevertheless and similar to C, we define an n×1 column vector P: $=[P_1 P_2 \ldots P_n]^T$ Based on two items above, we can define a function $f_c$ which calculates the final pre-tax price for a given configuration of ingredients x as $\overline{C}:=f_c(x, C)=\Sigma x_i(C_i+P_i))=\Sigma x_i(C_i+f_{p_i}(C_i)))$.

$L_i$: The nutrients, including both macronutrients and micronutrients (e.g., vitamins, carbohydrates, fats, minerals, water, proteins, etc.), and/or other properties of the minimal unit of the i-th ingredient. Note that, in the general case this might be a vector for each ingredient item as opposed to cost $C_i$ and profit $P_i$ which are scalars per ingredient item. For instance, without any loss of generality and without any importance of ordering, this vector could encode none, some or all of these main nutrient information for i-th ingredient The volume: This might to some extent address the hunger as higher volume foods or portion size might lead more to a feeling of fullness. Note that this is not a standard organic nutrient component (e.g., carbohydrate, mineral, vitamin, protein, etc.).

The calorie: Generally, it is assumed that it is better to reduce the in-take of total calories. Here we can further categorize calorie by their types or qualities. Calorie total for each Menu Item is displayed to the customer-user from a data set of stored data entries, such as elements in Matrix CAL. Of course, calorie data may overlap with data sets for nutrient data sets.

Fats: Lipids more generally, may include or separate into total fats, saturated fats, unsaturated fats, cholesterol content, triacylglycerols, diacylglycerols, and other lipids.

Carbohydrates: Including sugars, such as starches, lactose, sucrose, glucose, fructose, syrups, fructose corn syrup, high fructose corn-syrup, honey, and others. As one example, dietary restrictions can be important for this characteristic, as we can use this characteristic to select or modify items containing dairy products (ice-cream for example) to satisfy lactose-intolerant customer-users.

Minerals, including any chemical element such as Sodium, Potassium, Calcium, Copper, Iron, etc.

Salt: To help customer-users who would like to keep track of their blood pressure.

Proteins, including, but not limited to, gluten (useful for customer-users with gluten dietary restrictions).

Food additives: This category can include substances that are common ingredients in foods, but not necessarily nutritive, including, but not limited to, preservatives, caffeine, artificial sweeteners, dyes, etc.

Water content

Vitamins, including, but not limited to, A, B ($B_1$, $B_2$, $B_3$ etc.), C, D, E, and K.

Cost $C_i$.

Please note that and as showed above, each of items listed above could be higher dimensional vectors themselves. For instance, fats could span either or both saturated, unsaturated fatty acids, both LDL and HDL. Vitamins could include A, B1, B2, E, K, and so on. In an extreme case, we can even separate different nutrient (minerals, carbohydrates, fat, minerals, water and proteins), from each ingredient to a different category, for instance we can have minerals from a particular meat and from a particular vegetable into different categories or categorize calories based on their qualities.

Finally each of these properties might have similar or different senses such as median, mean, maximum, minimum and so on. For instance, we use the average calorie but the maximum fat for the i-th ingredient.

As stated before, this $L_i$ could be a vector in general. Let us use $\ell$ as the length of this vector. In the following we use $L_{i,j}$ to denote the j-th entry of this vector where $1 \leq j \leq \ell$. In words, $L_{i,j}$ denotes the j-th property of the i-th ingredient. Finally concatenating all $L_i$, we define L: $=[L_1^T L_2^T \ldots L_n^T]^T$. Indeed there could be other formulation for concatenation, for instance, putting each $L_i$ on one column of a matrix (e.g., L: $=[L_1 L_2 \ldots L_n]$) without departing the scope of this invention. However, for simplicity we adapt the first formulation.

T: Tax for the final food product and miscellaneous costs. Note that this parameter is a scalar and not a vector unlike previous parameters. Also, this tax might be different per food item type (e.g., to address the case that different price ranges could have different tax ratios). This could be a constant calculated offline, or calculated dynamically upon order based on the requested food item. The miscellaneous cost could be a fixed or additional charge to any sandwich for instance to consider the service, labor or other similar fees. However, for the simplicity and without any loss of generality, in the rest of this document, we refer to T simply as tax.). In the general tax model, we can write $T=f_{tax}(\overline{C})$ (recall that $\overline{C}$ is total price before tax) where $f_{tax}(z)$ for a constant z is a function which calculates total tax for z. For example and in the simplest flat tax model, we can assume that, this tax is some u percentage of the total cost of the sandwich $$T = f_{tax}(\overline{C}) = \frac{u\overline{C}}{100}.$$

Clearly, we can have other tax models in here (different price ranges, have different tax ratios and so on).

$M_i$: The maximum number of the i-th ingredient, the food service establishment will put in the food item. For instance, we know for certain that a roast beef sandwich (which is the k-th ingredient) would contain at most 8 slices of roast beef and hence in this case $M_k=8$. Define the vector M: $=[M_1 M_2 \ldots M_n]^T$. In other example, we do not allow a sandwich to have more than 5 small packets of mayo and hence $M_l=5$ if the constant l corresponds to mayo. Also, in case of the fast food example and in case we support d discretization steps for the bread (e.g., d=4 for 4 bread sizes of 3, 6, 9, 12 inches) and if q corresponds to the bread, then we can write it as $M_q=d=4$.

Finally, we need an objective function $g(\cdot)$ on the desirability of food item/service configuration. This function could operate on nutrient (vitamins, carbohydrates, fat, minerals, water and proteins) and other properties of food items we offer, i.e. L and/or the vector x (recall that $x_i$, the i-th entry of the vector x, denotes number of minimal unit of the i-th ingredient). An example of such desirability function could be $$g(x,L) = \sum_j a_{1,j}(x_1-b_1)^j + \sum_j a_{2,j}(x_2-b_2)^j + \ldots = \sum_i \sum_j a_{i,j}(x_i-b_i)^j$$

Where $\alpha_{i,j}$ and $b_j$ are real-valued constants which could be set by owner for instance either by manually hand-setting, trial and error, training based on some data-sets or calculated by any other algorithm. Also constants $\alpha_{i,j}$ might be functions of nutrient (vitamins, carbohydrates, fat, minerals, water and proteins) properties L as shown in the following special-case examples. We allow that j to be defined on "real-numbers" and hence terms of $x_i^\pi$ or $1/x$ and so on are supported as well. In the following, we propose some special cases of this general function.

Special case example 1) Recall that, $\ell$ denotes the length of the nutrient (vitamins, carbohydrates, fat, minerals, water and proteins) vector for each ingredient. A structured option for $g(x, L)$ could be $$g(x,L) = \sum_{j=1}^{\ell}\left(\lambda_j \sum_{i=1}^{n} L_{i,j}x_i\right) = \lambda_1 \sum_{i=1}^{n} L_{i,1}x_i + \lambda_2 \sum_{i=1}^{n} L_{i,2}x_i + \ldots = \sum_i a_i x_i$$

Let us explain this formulation briefly in here. Assuming accumulative effect of intake ingredients (e.g., eating two slices of roast beef with each 100 calorie and a 50 calorie bread leads to a total of 250 intake calorie), each $\Sigma_{i=1}^{n} L_{i,j}x_i$ is the total value for j-th nutrient property (e.g., total volume for j=1, total in-take calorie for j=2 based on ordering in the previous section). Finally by $$E_{j=1}^{\ell}\left(\lambda_j \sum_{i=1}^{n} L_{i,j}x_i\right)$$

we are performing a weighted sum of those nutrient values. A possible reason for such weighted sum could be to have different penalties/desirability for different nutritional properties. For instance, one might set a much higher penalty or less desirability for the total LDL compared to HDL by adjusting their corresponding weights $\lambda_j$. It should be clear that some or all weights $\lambda_j$ could be equal in the given formulation.

Special case example 2) We can easily generalize this first order function to a second order polynomial by defining "Q" and "c" as constant matrix and vectors (e.g., a fixed symmetric matrix and a vector), respectively, possibly functions of nutrient $L(Q=f_1(L) \in R^{n\times n}$ and $c=f_2(L) \in R^{n\times 1})$ and write $$g(x,L) = \frac{1}{2}x^T Q x + c^T x = \sum_i \sum_{j=1}^{2} a_{i,j}(x_i - b_i)^j$$

Then it would be easy to verify that j only takes natural values of at most two. Similar to the previous example, "Q" and "c" are constants and could be set either manually, by training on some data-sets or any other algorithm.

Approach

Our approach (at a high level) is as follow: a customer-user enters a food service center (e.g., fast food, ice-cream shop, etc. . . . ), he/she states, enters, chooses, or otherwise selects his/her requirement in the food, including some or all nutrient (vitamins, carbohydrates, fat, minerals, water and proteins), volume, calorie, and price bounds. These requirements would be encoded to some constraints and then the food service would solve (locally, over internet, or finds it in a cache or from a lookup table) an optimization problem with the given constraints and make or return the requested, modified, or otherwise created food menu item based on the solution to that optimization problem. The objective function of such optimization problem could be the desirability function $g(\cdot)$ introduced in the previous section. We now formulate this process with more details. As before and for the simplicity of demonstration, here we focus on a fast-food example, though it should be clear that, this approach is extendable to other food services such as an ice-cream shop, ethnic restaurants, bakeries, caterers, and so on.

When a customer walks in to the food service center he/she will provide the following constraints:

1. Required: $S \subseteq [n]:=\{1,2 \ldots n\}$. The set S encodes the ingredients, the customer-user wants. For instance, if the customer-user wants a turkey sandwich with lettuce, on whole wheat bread then S={1,4,23} (recall that 1, 4 and 23 correspond to turkey, lettuce and whole wheat bread, respectively in our previous example). This set gives us the constraint that Support{x}=S where Support{x} means locations of non-zero entries of a vector x. Note that, we can have traditional/quick menu where for instance combo #1,is a turkey sandwich which by default has tomato, lettuce and turkey. In these cases there is no need for the customer-user to declare "all" the ingredients of her/his sandwich. Thus, in this case by requesting a named (e.g., combo #1) menu item we can populate the entries of S.

2. Optional: $\omega \subset [n] \times O \times \mathbb{R}$, where $[n]:=\{1, 2, \ldots n\}$, O is an order operator i.e. <, >, =, <=,>=and $\mathbb{R}$ is the set of real numbers: This set of tuples encodes constraints on the ingredient asked by the customer-user. Specifically, the first entry of each tuple is the ingredient item. The second entry is about the ordering and the third entry (depending on the ordering operator) determines the lower, upper or quantity/amount of an ingredient. These constraints induced some sub-space on the count/amount of the minimal units of ingredient items. In, the rest of this section we denote this constrained space by $H_x$. Let us clarify by two examples. For instance, if the customer-user wants to have no more than 3-turkey slices (as opposed to our maximum proposal of $M_i$ slices), this method, operator, or the customer-user makes this into consideration by entering (1, ≤,3) in this set (recall that the first ingredient of our fast food example corresponds to turkey). In that case, the set w implies that we want $x_1 \leq 3$ and hence $H_x=\{x=[x_1 x_2 \ldots$ $x_n]^T: x_1 \leq 3\}$. In another example, assume that $\omega=\{(i_1, \leq, r_1), (i_2, \geq, r_2) \ldots\}$ then it means $H_x=\{x=[x_1 \, x_2 \ldots x_n]^T: x_{i_1} \leq r_1, x_{i_2} \geq r_2, \ldots\}$.

3. Optional: $\overline{\text{Cost}}$ The upper bound of the cost/budget, a customer-user is willing to pay. Considering the tax, we have $$T+f_c(x,C) \leq \overline{\text{Cost}},$$

Recall that, T accounts for the tax (and miscellaneous costs) and fc (x, C) is the total price pre-tax.

4. Optional $\Omega: \subset [l] \times O \times \mathbb{R}$, where l is the length of nutrient vector for each ingredient and O is an ordering operator i.e. $<, >, =, <=, >=$: This set of tuples encodes constraints on nutrient (explained in the previous section) asked by the customer-user. The first entry of each tuple corresponds to the nutrient item (e.g., volume, sugar, carbohydrates, and so on). The second entry is about the ordering and the third entry (depending on the ordering operator) determines the lower, upper or quantity of the nutrient value. Similar to $\omega$, we can convert these constraints to some induced space on the count of the minimal units of ingredient items. In, the rest of this section we denote this constrained space by $H_L$. In an example, assume that the customer-user wants to have its food item to have at most 500 calories and 30 grams of fats and in the list of nutrients 2 and 3 correspond to calories and fat. Then this method, operator, or the customer-user makes this into consideration by entering two entries for $\Omega$ as $\{(2, \leq, 500), (3, \leq, 30)\}$ in this set. The induced space would be $$\mathcal{H}_L = \left\{ x = [x_1 x_2 \ldots x_n]^T : \sum_i x_i L_{i,2} \leq 500, \sum_i x_i L_{i,3} \leq 30 \right\}.$$

In another example, assume that $\Omega=\{(j_1, \leq, s_1), (j_2, \geq, s_2), \ldots\}$ then it means $$\mathcal{H}_L = \left\{ x = [x_1 x_2 \ldots x_n]^T : \sum_i x_i L_{i,j_1} \leq s_1, \sum_i x_i L_{i,j_2} \geq s_2, \ldots \right\}.$$

As shown in FIG. 5, a sample method 1 which shows an example processing pipeline in, including steps for pre-processing, solving an equation/formula, post processing, and recalculating the price–given S, $\overline{\text{Cost}}$, $\omega$ and $\Omega$, our objective is to find $x_i$ for $i \in S$ (i.e., the number of each of the minimal ingredients items).

Given all inputs to the function $f_c$ described above, we define the optimal sandwich/food/item as the solution to the following optimization problem:

$\hat{x}=\text{argmax } g(x, L)$ subject to:

$\forall i \in \bar{S}: x_i = 0$ $\forall i \in S, 1 \leq x_i \leq M_i,$ $x \in H_L \cap H_x$ $T+f_c(x, C) \leq \overline{\text{Cost}}$ \hfill (Formula I)

As described above, the function $g(\cdot)$ is the desirability of the sandwich. Please note that, we considered costs as one of nutrient properties in L and hence, if desired by the service owner, the function $g(\cdot)$ could be a function of the price/cost or even tax. Also, we can change argmax to argmin depending on how $g(\cdot)$ is defined. It should be clear that one can solve the equivalent or some subset of this optimization problem without departing from this formulation, for instance by solving dual of this formulation or by including some subsets of the constraints in the formulation. Nevertheless, here we follow such general formulation for brevity as showing one embodiment of the disclosed invention.

Also, note that any of the constraints of (Formula I) which are not indicated by the user (e.g., optional entries in fc, could be removed from constraints or be replaced by some defaults).

Depending on function definitions for $g(\cdot)$, tax models $f_{tax}(\overline{C})$, profit model, this problem is a canonical optimization problem and could be solved by some generic solvers such as linear programming, quadratic programming, semi-definite programming and so on. For instance, for linear models of $g(\cdot)$, fixed ratio tax model, (Formula I) is a linear programming model and could be solved by any of-the-shelf linear programming solver, e.g., basis pursuit, Lasso and so on.

Even, for the second order example for $g(\cdot)$ in the previous example, it would be a constrained quadratic programming and could be solved by interior point, augmented Lagrangian, conjugate gradient and so on.

It should be noted that, even if based on the assumed models, we are dealing with a non-convex optimization problem, there exists many of-the-shelf non-convex solvers already available (like toolboxes provided by GOOGLE, MATLAB, gradient-descent, conjugate-gradient based, integer programming solvers, and so on).

Also, note that, the presented formulation could be either solved on-line for each customer-user or even we calculate all possible cases off-line and returned the results from a lookup table, cache or all processes to be done in a server.

If a lookup table or an integer programming solver is not deployed to the aforementioned optimization problem; then, the returned solution $\hat{x}=[\hat{x}_1 \hat{x}_2 \ldots \hat{x}_n]^T$ would be most likely a real valued number with a fractions/decimals rather than an integer (for instance it might look like 2.3 slices of roast beef are required for a sandwich). Clearly, this is neither desirable nor practical from the franchise point of view. This can be solved by post processing the solution vector x, for instance, by flooring (rounding to the closest smaller integer). Indeed other strategies could be applied in this stage.

Finally, we need to discuss the corner cases, since no one is interested in having a foot-long sandwich that has only one slice of turkey! It could be easily verified that many of our introduced parameters have dependencies on each other; for instance, each of tax, bread price, calories and size shall influence the number of other ingredients that can be fitted inside a sandwich. One way to resolve this issue is forming a small lookup table to help the optimization stage in a pre-processing stage. For instance, let's assume that a customer-user walks in and asks for a chicken sandwich, costing at most $5, having at most 300 calories. Also assume that the tax rate is flat 10% in the state. Then, we know that the sandwich value must cost at most $4.95. Either by another algorithm, or by a look up table trained offline, we can find out that, a 6-inch piece of bread should be sufficient for the sandwich, and it will cost $1 for the franchise. Hence, all the ingredients cost should be less than $3.95. As a final note, due to preprocessing and post-processing, the cost of the sandwich could be less than $4.95, and hence the tax could be less than five cents as well. Hence, having the solution x, we need to re-calculate the price of the sandwich. Of course, there are cases where the solution to Formula I, is not feasible. For example, a customer-user might walk-in asking for a turkey sandwich, costing 1 cent, which is not feasible given the cost of food, in which case such requests may be discussed with the customer-user in the restaurant or store, and perhaps negotiated into a range where calculation is feasible or return the closest feasible solution or other policies.

Turning now to FIG. 5, an example use case is shown to illustrate a method of dynamic pricing and configuration of all or some menu items, in accordance with an example embodiment. In this example, a customer-user may enter a restaurant and request a type of sandwich/food item at a desired price (e.g., "I would like a 'X', and I want to pay 'Y' dollars at most and I want nutrient property 'Q' be at most 'R'."). In some embodiments, the order is relayed to a cashier or server, and the order parameters (e.g., constraints for sandwich/food type, cost, and/or calories) may be entered into a POS system or other device running dynamic pricing software described herein. In some embodiments, the customer-user may enter the parameters themselves, e.g., through a one or more touch screens, POS system or mobile/remote device having a mobile app, web browser, or other application running on the device or say that verbally. Any missing optional information may also be entered or populated (e.g., upper bounds of cost and/or calories), and may include maximum or minimum default values or other parameter constraints as desired or be entered by the franchise operator. The system may access a database (e.g., locally or via a network), to determine nutritional values, ingredient costs and corresponding profit for the ordered item parameters or configuration(s). If a requested order is not practical or feasible for the restaurant, the system may respond by bargaining, returning the closest feasible solution, alert the user and/or suggest alternative menu configurations or even deny the request depending on owner policy of handling in this case.

If a requested menu item is feasible, e.g., within the desired profit parameters of the restaurant, then the system may perform pre-processing, e.g., to find a suitable bread size, and to set a minimum number of ingredients for instance by finding from a lookup table, cache, or deriving such number from the input parameters locally or send the information through internet to a server and receive results. After such pre-processing, the configuration and pricing of the ordered item may be calculated, by using algorithms and the methods described above, either locally, or by finding in a lookup table or cache, or send through internet to be calculated by a server and then receive the results. After such processing, or solving of equations/formulas, the results may be further processed (shown as "post-process"), e.g., to make the number of ingredients a realistic integer, if an integer programming solver or a look up table is not employed (e.g., to change 2.8 slices of turkey to 3 slices) and/or to force other desired constraints. Again the post processing step could be either through local calculation, lookup table, cache or through internet. The resulting composition of ingredients for a requested item may then be used to recalculate the price and complete the order, for example as shown in FIG. 5. In some embodiments, the final results might be displayed on a one or more screens as instructions to the food service owner to make the requested item with the given constraints.

The terms "comprising." "including." and "having." as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably." "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

The systems and methods of the present disclosure, including components thereof, can comprise, consist of, or consist essentially of the essential elements and limitations of the embodiments described herein, as well as any additional or optional components or limitations described herein or otherwise useful.

As used herein, the term "about," when referring to a value or to an amount of mass, weight, time, volume, concentration or percentage is meant to encompass variations of in some embodiments±20%, in some embodiments±10%, in some embodiments±5%, in some embodiments±1%, in some embodiments±0.5%, and in some embodiments±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and nonpatent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A system comprising one or more processors and non-transitory computer storage media storing instructions that, when executed by the one or more processors, cause the system to perform operations comprising:
provimiding, for presentation to a customer-user, an interactive user interface application, wherein the interactive user interface application at least:
enables selection of a food menu item to be ordered via the customer user, and
responds to specification, received from the customer-user and via the interactive user interface application, of one or more constraints associated with customizing the food menu item, the constraints adjusting respective ingredient characteristics associated with the food menu item,
wherein the system is configured to communicate via a network connection;
receiving, by the system, a first user selection of the food menu item, and accessing a first data structure identifying ingredients of the food menu item;
causing, by the system, updating of the interactive user interface application to cause presentation of information describing the food menu item, and receiving, by the system, specification of the one or more constraints associated with customizing the food menu item;
selecting, by the system, one or more data structures based on the specified one or more constraints, the one or more data structures mapping ingredient characteristics to respective ingredients;
determining, in real-time by the system for the food menu item, a set of ingredients customized according to the one or more constraints, the determining being based, at least in part, on application of an optimization equation using the first data structure and the selected one or more data structures,
wherein the optimization equation applies individual weights to individual ingredient characteristics, wherein ingredient characteristics are associated with different penalties or desirabilities, and wherein the weights affect determination of the set of ingredients as customized according to the constraints; and
transmitting, via the network connection, an order ticket for presentation to a restaurant-user, the presented order ticket associated with the retrieved food menu item.

2. The system of claim 1, wherein determining the set of ingredients comprises determining an output data structure associated with the optimization equation.

3. The system of claim 1, wherein the operations further comprise:
providing, for presentation, the set of the ingredients customized according to the one or more constraints,
wherein the system is configured to receive updates, from a user, to the one or more constraints and cause updates to the set of ingredients.

4. The system of claim 1, wherein the interactive user interface is configured to receive modifications to the set of the ingredients.

5. The system of claim 1, wherein the interactive user interface is configured to receive modifications to the one or more constraints.

6. The system of claim 1, wherein the operations further comprise generating a food modification ticket, and causing presentation of the food modification ticket.

7. The system of claim 1, wherein the operations further comprise:
accessing a database storing nutritional information associated with the selected food menu item selected; and
providing an output comprising nutritional information obtained from the database, such that deficiencies with respect to nutrients can be identified.

8. The system of claim 1, wherein the ingredient characteristics comprise at least one of nutritional characteristics, price characteristics, volume characteristics, or caloric characteristics.

9. The system of claim 8, wherein each of the one or more data structures comprises a matrix referenceable according to an ingredient.

10. The system of claim 1, wherein the optimization equation comprises:

$$\hat{x} = \operatorname{argmax} g(x, L)$$

subject to:

$$\forall i \in S: x_i = 0$$

$$\forall i \in \bar{S}, 1 \le x_i \le M_i,$$

$$x \in H_L \cap H_x$$

$$T + f_c(x, C) \le \overline{\text{Cost}}$$

wherein x is a solution to the particular equation, g is a desirability function, S is a set of ingredients, L represents nutrients associated with respective ingredients, $M_i$ is a max count bound on the $i^{th}$ ingredient, $H_L$ and are $H_x$ are induced spaces by constraints on ingredients and requested nutrients, T is a tax, fc is a cost function, and $\overline{\text{Cost}}$ is the amount the customer is willing to pay.

11. The system of claim 1, wherein the system is configured to determine feasibility associated with the customized food item, and based on customization not being feasible the system is further configured to modify at least one of the specified constraints.

12. A method comprising:
by a system of one or more computers,
providing, by the system for presentation to a customer-user, an interactive user interface application, wherein the interactive user interface application at least:
enables selection of a food menu item to be ordered, and
responds to specification, received from the customer-user and via the interactive user interface application, of one or more constraints associated with customizing the food menu item, the constraints adjusting respective ingredient characteristics associated with the food menu item,
wherein the system is configured to communicate with via a network connection;
receiving, by the system, a first user selection of the food menu item, and accessing a first data structure identifying ingredients of the food menu item;
causing, by the system, updating of the interactive user interface application to cause presentation of information describing the food menu item, and receiving, by the system, specification of the one or more constraints associated with customizing the food menu item;
selecting, by the system, one or more data structures based on the specified one or more constraints, the one or more data structures mapping ingredient characteristics to respective ingredients;

determining, in real-time by the system for the food menu item, a set of ingredients customized according to the one or more constraints, the determining being based, at least in part, on application of an optimization equation using the first data structure and the selected one or more data structures, wherein the optimization equation applies individual weights to individual ingredient characteristics, wherein ingredient characteristics are associated with different penalties or desirabilities, and wherein the weights affect determination of the set of ingredients as customized according to the constraints; and transmitting, via the network connection, an order ticket for presentation to a restaurant-user, the presented order ticket associated with the retrieved food menu item.

13. The method of claim 12, wherein the determining the set of ingredients comprises determining an output data structure associated with the optimization equation.

14. The method of claim 12, further comprising:
providing, for presentation, the set of the ingredients customized according to the constraints,
wherein the system is configured to receive updates, from a user, to the one or more constraints and cause updates to the set of ingredients.

15. The method of claim 12, further comprising receiving a modification to the set of the ingredients and/or the one or more constraints.

16. The method of claim 12, further comprising:
generating a food modification ticket, and causing presentation of the food modification ticket.

17. The method of claim 12, further comprising:
accessing a database storing nutritional information associated with the selected food menu item; and
providing, to the point of sale system, an output comprising nutritional information obtained from the database, such that deficiencies with respect to nutrients can be identified.

18. The method of claim 12, wherein the ingredient characteristics comprise at least one of nutritional characteristics, price characteristics, volume characteristics, or caloric characteristics.

19. The method of claim 18, wherein each of the one or more data structures comprises a matrix referenceable according to ingredient.

20. The method of claim 12, wherein the system comprises a touch screen configured to receive the first user selection from a user.

21. The method of claim 12, wherein the optimization equation comprises:

$$\hat{x} = \text{argmax } g(x, L)$$

subject to:

$$\forall i \in S: x_i = 0$$

$$\forall i \in S, 1 \leq x_i \leq M_i,$$

$$x \in H_L \cap H_x$$

$$T + f_c(x, C) \leq \overline{\text{Cost}}$$

wherein x is a solution to the particular equation, g is a desirability function, S is a set of ingredients, L represents nutrients associated with respective ingredients, $M_i$, is a max count bound on the $i^{th}$ ingredient, $H_L$ and are $H_x$ are induced spaces by constraints on ingredients and requested nutrients, T is a tax, fc is a cost function, and $\overline{\text{Cost}}$ is the amount the customer is willing to pay.

* * * * *